US008007426B2

(12) United States Patent
Shirose et al.

(10) Patent No.: US 8,007,426 B2
(45) Date of Patent: Aug. 30, 2011

(54) DEVELOPING ROLLER

(75) Inventors: Meizo Shirose, Hachioji (JP); Satoshi Uchino, Hino (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 929 days.

(21) Appl. No.: 11/917,249

(22) PCT Filed: Jun. 29, 2005

(86) PCT No.: PCT/JP2005/011948

§ 371 (c)(1), (2), (4) Date: Dec. 12, 2007

(87) PCT Pub. No.: WO2007/000819

PCT Pub. Date: Jan. 4, 2007

(65) Prior Publication Data

US 2009/0035027 A1 Feb. 5, 2009

(51) Int. Cl.
*F16C 13/00* (2006.01)

(52) U.S. Cl. ................. 492/56; 492/53; 492/49; 492/48

(58) Field of Classification Search .................... 492/48, 492/49, 53, 56
See application file for complete search history.

(56) References Cited

U.S. PATENT DOCUMENTS 5,697,027 A * 12/1997 Takagi et al. ................. 399/279
6,004,669 A * 12/1999 Rokutan et al. ............... 428/335
6,580,892 B2 * 6/2003 Ohuchi ......................... 399/286
6,832,065 B2 * 12/2004 Nakamura et al. ............ 399/286
6,908,419 B2 * 6/2005 Takashima et al. ............ 492/56
6,918,866 B2 * 7/2005 Miyamori et al. .............. 492/56
6,945,921 B2 * 9/2005 Sirejacob ........................ 492/56
7,505,720 B2 * 3/2009 Sugama et al. ............... 399/286
7,672,626 B2 * 3/2010 Uchino et al. ................ 399/286
7,817,949 B2 * 10/2010 Shirose et al. ................ 399/302
2003/0119639 A1 6/2003 Manabe et al.
2003/0216234 A1 * 11/2003 Sirejacob ........................ 492/56
2004/0058791 A1 * 3/2004 Takashima et al. ............ 492/56

FOREIGN PATENT DOCUMENTS

JP 9-254276 A 9/1997
JP 2003-003032 A 1/2003
JP 2003-107820 A 4/2003
JP 2004-210828 7/2004
WO WO 01/59010 8/2001

OTHER PUBLICATIONS

Notification of Reasons for Refusal issued in corresponding Japanese Patent Application No. 2007-523267 dated Jan. 5, 2010, and an English Translation thereof.

(Continued)

*Primary Examiner* — Essama Omgba
(74) *Attorney, Agent, or Firm* — Buchanan Ingersoll & Rooney PC

(57) ABSTRACT

A developing roller that can form a toner image with high quality includes: a supporting shaft, and at least one resin layer formed on a peripheral face of the supporting shaft, the resin layer containing carbon black in which a number average Feret's diameter is in a range from 5 to 300 nm and primary particles account for 5% or more on a number basis, and the carbon black being dispersed in a base resin material thereof.

7 Claims, 10 Drawing Sheets

OTHER PUBLICATIONS

The International Preliminary Report on Patentability and Accompanying Written Opinion mailed in related International Patent Application No. PCT/JP2005/011948 on Jan. 17, 2008. (with English Translation).
Notification of Reasons for Refusal issued in the corresponding Japanese Patent Application No. 2007-523267 dated Apr. 20, 2010, and an English Translation thereof.
A Chinese Office Action issued in corresponding Chinese Patent Application No. 200580051455.5, dated Jul. 24, 2009, and partial English translation thereof.
A Notification of Reasons for Refusal issued in corresponding Japanese Patent Application No. 2007-523267, mailed Sep. 24, 2009, and English translation thereof.
Form PCT/ISA/210 (International Search Report) dated Sep. 6, 2005.

* cited by examiner

PRIOR ART

PRIOR ART

PRIOR ART

DEVELOPING ROLLER

TECHNICAL FIELD

The present invention relates to a developing roller that is used for an image-forming apparatus in which an electrophotographic process is adopted, such as an electrophotographic copying machine and a printer.

BACKGROUND ART

In general, image-forming processes in a copying machine and a printer that use an electrophotographic process are carried out in the following manner: That is, by exposing a charged photosensitive drum, an electrostatic latent image is formed, and by allowing toner to adhere to this electrostatic latent image, a toner image is formed, and an image is formed by transferring this toner image onto a sheet of recording paper. In this electrophotographic process, with respect to the method for forming a toner image, as shown in FIG. 8, a system using a developing roller 1 (contact developing system) is adopted. Toner 3, charged and supplied onto the developing roller 1, is transported in a right rotating direction following the rotation of the developing roller 1, and is allowed to pass between the developing roller 1 and a toner-layer thickness regulating member 2 so as to be adjusted to a predetermined layer thickness. The toner 3 is transported to a developing area at which the developing roller 1 and a photosensitive member 4 are made face to face with each other, following the rotation of the developing roller 1; thus, the toner is allowed to adhere to the electrostatic latent image on the photosensitive member 4 by a function of a bias potential applied between the developing roller 1 and the photosensitive member 4 so that a toner image is formed.

As shown in FIG. 9, this developing roller 1 has a multi-layer structure in which, on a core metal member 11 serving as a supporting shaft, a base rubber layer 12, an intermediate layer 13 and a surface layer 14 are formed in this order, and carbon black is dispersed in each of the base rubber layer 12, the intermediate layer 13 and the surface layer 14, so as to adjust each of the layers to an appropriate conductivity.

DISCLOSURE OF INVENTION

Technical Problems to be Solved

In the case of a developing roller using carbon black that is commercially available, however, when a solid image (solid latent image) is developed, a problem arises in which lack in uniformity of density occurs. Examinations of the inventors or the like have found that this problem is caused by deviations in conductivity depending on the portions of the developing roller and that carbon black dispersed in each of the layers forms one of the reasons for this problem.

Normally, the carbon black is composed of secondary particles formed by a plurality of basic particles that are chemically and/or physically combined with one another, that is, an aggregate (referred to also as a structure) (FIG. 10). This aggregate has a complex aggregated structure that is branched into irregular chain forms. Since the aggregates are formed into secondary aggregates by a Van der Waals force or through simple aggregation, adhesion, entangling, or the like, it has been difficult to obtain a sufficiently micro-dispersed structure. Because of a complex form, even when the carbon black is dispersed in each medium of the developing roller, it was difficult that those compositions show uniform conductivity.

In particular, silicone and urethane are mainly used as the base material for the base rubber layer, and since the affinity between the base material and carbon black is poor, the dispersibility becomes insufficient, and this also forms one reason for the difficulty in preparing even conductivity.

On the surface layer, another problem is that due to mechanical contact and friction against the toner layer thickness regulating member and the photosensitive member, aggregates tend to be separated from the surface layer, with the result that the electrical property changes with time.

Therefore, the objective of the present invention is to provide a developing roller that can form a toner image with high quality.

Means to Solve the Problems

The above-mentioned objective can be achieved by the following means (1) to (9).

(1) A developing roller comprising: a supporting shaft, and at least one resin layer formed on a peripheral face of the supporting shaft, the resin layer containing carbon black in which a number average Feret's diameter is in a range from 5 to 300 nm and primary particles account for 5% or more on a number basis, and the carbon black being dispersed in a base resin material thereof.

(2) The developing roller described in the above-mentioned (1) in which the resin layer includes a plurality of resin layers, with at least one of the resin layers having the above-mentioned carbon black dispersed therein.

(3) The developing roller described in the above-mentioned (2) in which the resin layers include a base rubber layer formed on the supporting shaft and a surface layer formed on the peripheral side from the base rubber layer.

(4) The developing roller described in the above-mentioned (3) in which the above-mentioned carbon black is dispersed in the base rubber layer.

(5) The developing roller described in the above-mentioned (3) in which the above-mentioned carbon black is dispersed in the surface layer.

(6) The developing roller described in the above-mentioned (3) in which an intermediate layer is formed between the base rubber layer and the surface layer.

(7) The developing roller described in the above-mentioned (6) in which the above-mentioned carbon black is dispersed in the intermediate layer.

(8) The developing roller described in any of the above-mentioned (1) to (7) in which the surface of the carbon black particle is surface-treated with an organic compound.

(9) The developing roller described in the above-mentioned (8) in which the organic compound contains at least one of a phenol-based compound and or or an amine-based compound.

The following description will discuss primary particles in the present application. Normally, carbon black is present in an aggregate form, and the aggregate is a form, in which plurality of basic particles are chemically and/or physically aggregated. In the present application, the primary particles refer to the basic particles. However, the primary particles do not refer to the basic particles in a state in which the basic particles form an aggregate, but refer to particles that are present stably in a state in which the basic particles are separate from the aggregate. Secondary particles in the present application refer to an aggregate formed by aggregating the basic particles. Here, in the present application, secondary aggregates formed by aggregation of the aggregates are generally referred to as secondary particles.

FIG. 1 is a drawing illustrating the relationship between secondary particles and basic particles. The state formed by aggregating the basic particles is defined as a secondary particle. FIG. 2 represents a state in which basic particles that have formed secondary particles are separated from the secondary particles and are stably maintained, and this particle that is present as a single basic particle is defined as a primary particle. The description will be further given as follows.

(1) Number Average Particle Size of Feret's Diameter

The carbon black applied to the developing roller of the present invention has a number average particle size of Feret's diameter in the range from 5 to 300 nm. The range is preferably from 10 to 100 nm, particularly preferably from 10 to 80 nm.

By providing this range, the carbon blacks can be dispersed densely on the surface of, for example, a resin molded product, and the surface characteristics can be improved.

Here, an object to be measured in a number average particle size of Feret's diameter is each of the primary particles and the secondary particles of carbon black that are present in a stable state. In the case of carbon black that is present as an aggregate, the aggregate is the object to be measured, and the basic particles in the aggregate are not measured.

The controlling process into this number average particle size can be achieved by the following operations: the particles of the carbon black that are present as an aggregate and have basic particle sizes within the above-mentioned range are properly selected and processed, or conditions during the production process for dividing the aggregate into primary particles are altered.

The number average particle size of Feret's diameter can be observed by means of an electron microscope.

Upon finding the number average particle size of Feret's diameter from carbon black simple substance, an enlarged photograph may be taken at magnification of 100000 by using a scanning electron microscope (SEM), and 100 particles may be properly selected to calculate the number average particle size of Feret's diameter.

In the case when the average particle size of carbon black is found from a molded product such as a resin, an enlarged photograph may be taken at magnification of 100000 by using a transmission electron microscope (TEM), and 100 particles may be properly selected to calculate the number average particle size.

The Feret's diameter, used in the present invention, refers to the largest length in a predetermined one direction of each of carbon black particles, among carbon black particles photographed by using the above-mentioned electron microscope. The largest length represents a distance between parallel lines, that is, two parallel lines that are drawn perpendicular to the predetermined one direction so as to be made in contact with the outer diameter of each particle.

For example, in FIG. 3, with respect to a photograph 300 of carbon black particles 200 taken by using an electron microscope, one direction 201 is arbitrarily determined. The distance between two straight lines 202 that are perpendicular to the predetermined direction 201 and made in contact with each carbon black particle 200 represents a Feret's diameter 203.

The carbon black applied to the developing roller of the present invention is preferably designed to have a number average particle size of Feret's diameter of the primary particles of 2 to 100 nm, and particularly 3 to 80 nm. By using the carbon black within this range, the strength thereof can be increased when dispersed in a resin molded product. The degree of gloss of the molded product can be improved, and a superior finished state can be achieved. The method for measuring the number average particle size of the primary particles is the same as the measuring method for the number average particle size of the carbon black. Here, the number of measured particles corresponds to 100 primary particles.

(2) Rate of Primary Particles

The carbon black applied to the developing roller of the present invention contains 5% or more of primary particles in the carbon black on a basis of number. The upper limit is 100%. The rate preferably varies depending on the industrial fields to which it is applied. As the rate of content of the primary particles increases, the better performance is obtained in the product in the industrial field. In the case of resin molded products, mechanical strength, surface gloss property and the like can be improved. More specifically, the better results can be obtained in the order of 10% or more, 20% or more, 30% or more, 40% or more and 50% or more. Upon measuring the rate of the primary particles, the same process as described above is carried out by using the electron microscope, and the number of measured particles is calculated by counting the primary particles that are present in 1000 carbon black particles.

(3) Carbon Black

The carbon black applied to the developing roller of the present invention is preferably designed so that the surface of each of carbon black particles that are stably present finally is surface-treated (including a graft treatment) with an organic compound or the like.

Supposing that the amount of an organic compound prior to the reaction is Y and that the amount of the extracted organic compound is Z, the rate of graft treatment is represented by the following formula.

$$((Y-Z)/Y)\times 100(\%).$$

The rate of graft treatment is preferably set to 50% or more. As the surface treatment is carried out more uniformly, the dispersibility is further improved.

The carbon black applied to the developing roller of the present invention is preferably subjected to a graft treatment with an organic compound that has active free radicals or is capable of producing active free radicals, which will be described later. With this arrangement, it is possible to improve the dispersibility in a medium and also to improve mechanical strength.

(4) Production Method of Carbon Black

The following description will discuss a preferable production method of carbon black applied to the developing roller in accordance with the present invention.

A preferable production method to be applied to the present invention is provided with at least the following processes:

(A) Surface treatment process, in which the surface of carbon black containing secondary particles made of at least aggregates (structure) of basic particles is treated with an organic compound that has active free radicals or is capable of producing active free radicals; and (B) A process, in which, by applying a mechanical shearing force to the carbon black containing at least secondary particles to give primary particles, and an organic compound is grafted onto a separation face from which the separation is made from the secondary particle.

The following description will discuss the processes (A) and (B) in detail.

(A) The surface treatment process, in which at least the surface of carbon black containing secondary particles made of at least aggregates (structure) of basic particles is treated with an organic compound that has active free radicals or is capable of producing active free radicals.

In this process, the surface of carbon black composed of aggregates (structure) is surface-treated with the above-mentioned organic compound.

In the present process, radicals are generated on the surface of a structure that is the minimum aggregation unit by applying heat or a mechanical force thereon, and the surface treatment is carried out by using an organic compound capable of capturing the radicals. By this process, re-aggregated portions that have been aggregated again by a strong aggregating force between the carbon blacks can be effectively reduced, so that the structure and the primary particles of the carbon black can be prevented from being aggregated and adhered.

The surface treatment includes a process in which an organic compound is adsorbed on the surface and a process in which the organic compound is grafted thereon. In order to stabilize the particles that have been formed into primary particles, the organic compound is preferably grafted onto the entire surface of a secondary particle at portions except for the surface where separation is made from the secondary particle. In order to allow the primary particles to be stably present after the grafting process, which will be described later, it is preferable to graft the organic compound onto the surface of the carbon black in this process.

With respect to the method for the surface treatment, for example, a method in which carbon black aggregates and an organic compound that has active free radicals or is capable of generating active free radicals are mixed with each other may be used. The surface treatment preferably includes a mixing process in which a mechanical shearing force is applied. That is, it is presumed that, in the process in which the mechanical shearing force is applied thereto, the surface of secondary particles of the carbon black is activated, and that the organic compound itself is activated by the shearing force to easily form a radicalized state, with the result that the grafting process of the organic compound onto the surface of the carbon black is easily accelerated.

In the surface treatment process, a device that is capable of applying a mechanical shearing force is preferably used.

The preferable mixing device to be used in the surface treatment process in the present invention includes: a Polylabo System Mixer (Thermo Electron Co., Ltd.), a refiner, a single-screw extruder, a twin-screw extruder, a planetary extruder, a cone-shaped-screw extruder, a continuous kneader, a sealed mixer, a Z-shaped kneader and the like.

When upon carrying out the surface treatment, the above-mentioned device is used, the degree of filling of mixture in the mixing zone of the mixing device is preferably set to 80% or more. The degree of filling is found by the following equation:

$$Z=Q/A$$

Z: degree of filling (%) Q: volume of filled matter ($m^2$) A: volume of cavity of mixing section ($m^2$)

In other words, by providing a highly filled state during the mixing process, the mechanical shearing force can be uniformly applied to the entire particles. When the degree of filling is low, the transmission of the shearing force becomes insufficient to fail to accelerate the activity of the carbon black and the organic compound, with the result that the grafting process might hardly progress.

During the mixing process, the temperature of the mixing zone is set to the melting point of the organic compound or more, preferably within the melting point +200° C., more preferably within the melting point +150° C. In the case when a plurality of kinds of organic compounds are mixed, the temperature setting is preferably carried out with respect to the melting point of the organic compound having the highest melting point.

During the mixing process, irradiation of electromagnetic waves, such as ultrasonic waves, microwaves, ultraviolet rays and infrared rays, ozone function, function of an oxidant, chemical function and/or mechanical shearing force function may be used in combination so that the degree of the surface treatment and the process time can be altered. The mixing time is set to 15 seconds to 120 minutes, although it depends on the desired degree of the surface treatment. It is preferably set to 1 to 100 minutes.

The organic compound to be used for the surface treatment is added to 100 parts by weight of carbon black, within the range from 5 to 300 parts by weight, to carry out the surface treatment process. More preferably, it is set to 10 to 200 parts by weight. By adding the organic compound within this range, it is possible to allow the organic compound to uniformly adhere to the surface of the carbon black, and also to supply such a sufficient amount that the organic compound is allowed to adhere to separated faces to be generated at the time when the secondary particles are formed. For this reason, it becomes possible to effectively prevent decomposed primary particles from again aggregating, and also to reduce the possibility of losing inherent characteristics of the carbon black in the finished carbon black, due to an excessive organic compound contained therein when excessively added beyond the above-mentioned amount of addition.

(B) The process in which, by applying a mechanical shearing force to carbon black containing at least secondary particles to give primary particles, and an organic compound is grafted onto separated faces from which the separation is made from the secondary particle.

The present process corresponds to a process in which the carbon black having reduced re-aggregation portions by the surface treatment process is cleaved so that secondary particles are formed into primary particles and the organic compound is grafted onto the surface thereof so that stable primary particles are formed. That is, for example, a mechanical shearing force is applied to the carbon black that has been surface-treated with the organic compound, and while the aggregated portion of basic particles is being cleaved, the organic compound is grafted onto the cleaved portion so that the re-aggregation of the carbon black is suppressed. When the mechanical shearing force is continuously applied to the carbon black, the cleaved portion is expanded, and the organic compound is grafted onto the separated faces caused by the cleavage while being formed into primary particles. Thus, at the time when the separation is finally made to form primary particles, no active portions capable of aggregating are present so that stable primary particles are prepared. In this case, since the same mechanical shearing force is also applied to the added organic compound, the organic compound itself is activated by the mechanical shearing force so that the graft treatment is accelerated.

In the present specification, the term, "carbon black to which an organic compound is grafted" refers to carbon black having a carbon black portion to which an organic compound portion is grafted. The term "grafting" means an irreversible addition of an organic compound to a matrix such as carbon black, as defined in "Carbon Black" written by Donnet (Jean-Baptiste Donnet) (published on May 1, 1978, by Kodansha Ltd.).

The above-mentioned grafting process is a process in which an organic compound that has active free radicals or is capable of producing active free radicals is grafted onto at least a cleaved portion; however, the grafting process may be simultaneously carried out at portions other than the cleaved portion. The grafting process may be carried out simultaneously, while the surface treatment process is being executed, or may be carried out as a separated process.

With respect to the means used for causing the cleavage, various methods, which include irradiation of electromagnetic waves, such as ultrasonic waves, microwaves, ultraviolet rays and infrared rays, ozone function, function of an oxidant, chemical function and mechanical shearing function, may be adopted.

In the present invention, the cleavage is preferably caused by applying at least a mechanical shearing force. Carbon black (structure), surface-treated with an organic compound, is placed in a place where a mechanical shearing force is exerted, and the surface-treated carbon black is preferably treated to give primary particles from the structure. Upon applying the mechanical shearing force, any of the above-mentioned methods used for causing the cleavage may be used in combination.

The same shearing force as the mechanical shearing force used in the surface treatment process is preferably used as the mechanical shearing force in this process.

As described above, the function of the mechanical shearing force is used not only for forming carbon black into fine particles from aggregates to primary particles, but also for cutting chains inside the carbon black to generate active free radicals. The organic compound, which is used in the present invention, and has free radicals or is capable of generating free radicals, includes, for example, an organic compound that is divided by receiving, for example, a function of the field of the mechanical shearing force to be allowed to have or generate active free radicals. In the case when the active free radicals are not sufficiently generated only by the function of the mechanical shearing force, the number of the active free radicals may be compensated for, by using irradiation with electromagnetic waves, such as ultrasonic waves, microwaves, ultraviolet rays and infrared rays, function of ozone or function of an oxidant.

With respect to the device for applying the mechanical shearing force, for example, the following devices may be used: a Polylabo System Mixer (Thermo Electron Co., Ltd.), a refiner, a single-screw extruder, a twin-screw extruder, a planetary extruder, a cone-shaped-screw extruder, a continuous kneader, a sealed mixer and a Z-shaped kneader. With respect to the conditions under which the mechanical shearing force is applied, the same conditions as those in the aforementioned surface treatment process are preferably used from the viewpoint of effectively applying the mechanical shearing force. By using these devices, the mechanical energy is uniformly applied to the entire particles effectively as well as continuously so that the grafting process can be preferably carried out effectively as well as uniformly.

In the above-mentioned surface treatment process and grafting process, the organic compound to be added may be gradually added continuously or intermittently so as to be set to a predetermined amount thereof, or a predetermined amount thereof may be added at the initial stage of the surface treatment process, and processes up to the grafting process may be executed.

With respect to the organic compound to be used for the surface treatment process as a material for the surface treatment and the organic compound to be used for the grafting process as a material to be graft-reacted, the same compounds may be used, or different compounds may be used.

The above-mentioned grafting process is preferably carried out under the condition of the melting point of the used organic compound or more. The upper limit of the temperature condition is preferably set, in particular, within the melting point +200° C., more preferably within the melting point +150° C. from the viewpoints of accelerating the grafting reaction and the division into primary particles. In the case when a plurality of kinds of organic compounds are mixed, it is preferable to carry out the temperature setting with respect to the melting point of the organic compound having the highest melting point.

The period of time during which the mechanical shearing force is applied is preferably set within the range from 1 to 100 minutes so as to sufficiently execute the process, from the viewpoint of improving the homogeneity of the reaction.

In the above-mentioned production method, the mechanical shearing force is preferably applied thereto by mixing carbon black and an organic compound that will be described later, without using a solvent. Since the shearing force is applied at a temperature of the melting temperature of the organic compound or more during the reaction, the organic compound is formed into a liquid state and well attached to the surface of the carbon black that is a solid substance uniformly so that the reaction is allowed to proceed effectively. In the case when a solvent is used, although the homogeneity is improved, the transmission of energy is lowered upon applying the mechanical shearing force to cause a low level of activation, with the result that it presumably becomes difficult to effectively carry out the grafting process.

Here, with respect to the method for adjusting the amount of the primary particles, although not particularly limited, the amount thereof can be adjusted by changing conditions under which the aforementioned mechanical shearing force is applied. More specifically, the degree of filling of mixture in the mixing zone of the mixing device used for applying the shearing force is preferably set to 80% or more, and by changing the degree of filling, the mechanical shearing force is altered so that the rate of the content of the primary particles can be adjusted. The rate thereof can be adjusted by changing the stirring torque at the time of the mixing process, and with respect to the torque adjusting method, in addition to the above-mentioned degree of filling, the number of revolutions of the stirring process and the stirring temperature may be changed to control the torque. More specifically, when the temperature at the time of mixing is lowered, the viscosity of the organic compound in the fused state tends to become higher to cause the torque to become higher so that the shearing force to be applied consequently increases. That is, the content of the primary particles increases.

2) Carbon Black as Starting Material

Examples of an applicable carbon black include furnace black, channel black, acetylene black, Lamp Black, and the like and any of these are commercially available and carbon blacks having an aggregate structure. This aggregate structure has “a structure constitution” formed with primary particles or basic particles aggregated, which means a so-called carbon black formed into secondary particles, made of an aggregate of the primary particles. In order to smoothly carry out the surface treatment and grafting reaction of an organic compound onto carbon black, sufficient amounts of oxygen-containing functional groups, such as a carboxyl group, a quinone group, a phenol group and a lactone group, and active hydrogen atoms on the layer face peripheral edge, are preferably placed on the surface of the carbon black. For this reason, the carbon black to be used in the present invention is preferably allowed to have an oxygen content of 0.1% or more and a hydrogen content of 0.2% or more. In particular, the oxygen content is 10% or less and the hydrogen content is 1% or less. Each of the oxygen content and the hydrogen content is found as a value obtained by dividing the number of oxygen elements or hydrogen elements by the total number of elements (sum of carbon, oxygen and hydrogen elements).

By selecting these ranges, it is possible to smoothly carry out the surface treatment and grafting reaction of an organic compound onto carbon black.

By selecting the above-mentioned ranges, an organic compound that has free radicals or is capable of generating free radicals is certainly grafted onto carbon black so that the re-aggregation preventive effect can be improved. In the case when the oxygen content and hydrogen content of the carbon black surface are smaller than the above-mentioned ranges, a gaseous phase oxidizing process, such as a heated air oxidization and an ozone oxidization, or a liquid phase oxidizing process by the use of nitric acid, hydrogen peroxide, potassium permanganate, sodium hypochlorite, or bromine water, may be used to increase the oxygen content and the hydrogen content of the carbon black.

3) Organic Compound

An organic compound to be used for surface-treating carbon black in the surface treatment, or to be grafted onto carbon black in the grafting process, corresponds to an organic compound that has free radicals or is capable of generating free radicals.

In the organic compound that is capable of generating free radicals, although not particularly limited, the condition for generating free radicals requires a state in which the organic compound possesses free radicals during the grafting process, in the case of the organic compound to be used in the present invention. With respect to the organic compound, a compound capable of generating free radicals by at least electron movements, a compound capable of generating free radicals through thermal decomposition and a compound capable of generating free radicals derived from cleavage of the compound structure due to a shearing force or the like, may be preferably used.

With respect to the organic compound that has free radicals or is capable of generating free radicals to be used in the present invention, its molecular weight is preferably 50 or more, and the upper limit is preferably 1500 or less. By adopting the organic compound having a molecular weight within this range, it is possible to form carbon black whose surface is substituted by an organic compound having a high molecular weight to a certain degree, and consequently to restrain the resulting primary particles from being re-aggregated. By using the organic compound having a molecular weight of 1500 or less, an excessive surface modification can be avoided, and the characteristics of the organic compound grafted onto the surface are prevented from being excessively exerted; thus, it becomes possible to sufficiently exert the characteristics of the carbon black itself.

With respect to the organic compound to be used for the surface treatment process and the organic compound to be used for the grafting process, the same compound may be used, or different compounds may be used, and a plurality of kinds of organic compounds may be added to the respective processes. In order to control the reaction temperatures and simplify the other conditions, the same organic compound is preferably used for the surface treatment process as well as for the grafting process.

Examples of the organic compound include organic compounds that can capture free radicals on the surface of carbon black, such as a phenol-based compound, an amine-based compound, a phosphate-based compound and a thioether-based compound.

So-called antioxidants and photostabilizers are preferably used as these organic compounds. More preferably, hindered-phenol based ones and hindered-amine based ones may be used. Those antioxidants of phosphate ester-based compounds, thiol-based compounds and thioether-based compounds may also be used. A plurality of these organic compounds may be used in combination. Depending on the combinations thereof, various characteristics for the surface treatment can be exerted.

In order to positively control the reaction, these organic compounds are preferably the ones not having an isocyanate group. That is, in the case when an organic compound having an excessive reactivity is used, it becomes difficult to provide a uniform grafting reaction, sometimes resulting in a prolonged reaction time and a large quantity of the organic compound to be used. Although not clearly confirmed, the reason for this is presumably because in the case of using an organic compound having a high reactivity as described above, the reaction tends to progress at points other than the surface active points, with the result that the reaction to the active points formed by the mechanical shearing force, which is an original object, becomes insufficient.

Specific examples of the organic compound are shown below:

Phenol-Based Compounds (Organic Compounds 1 to 88)

(Organic compound 1)

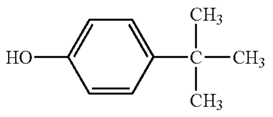

(Organic compound 2)

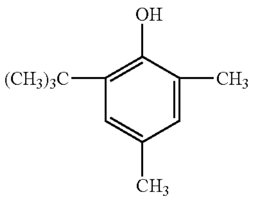

(Organic compound 3)

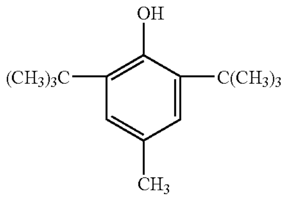

(Organic compound 4)

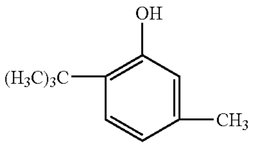

-continued
(Organic compound 5)
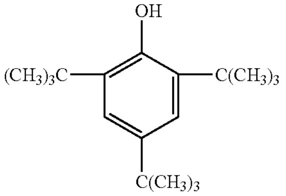
(Organic compound 6)
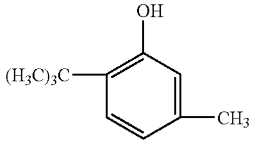
(Organic compound 7)
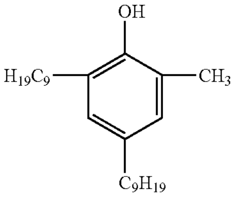
(Organic compound 8)
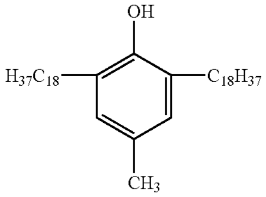
(Organic compound 9)
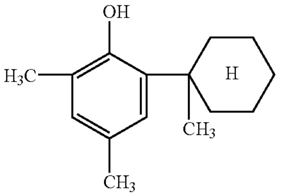
(Organic compound 10)
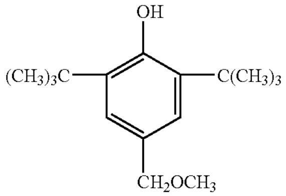
(Organic compound 11)
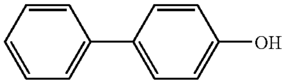
(Organic compound 12)
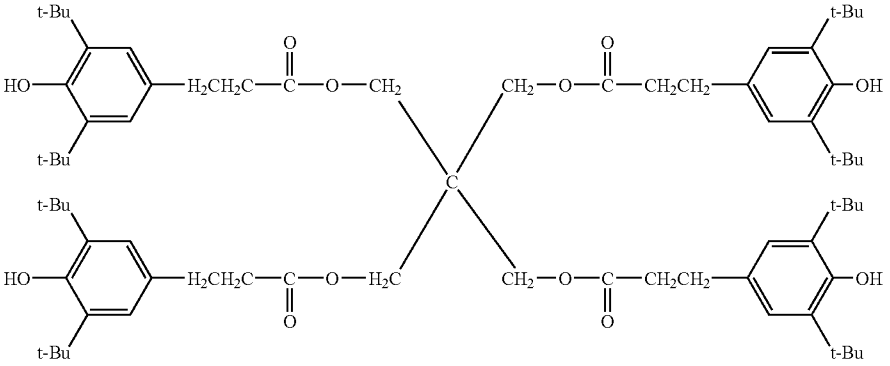
(Organic compound 13)
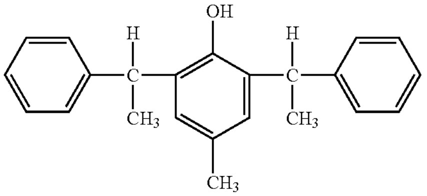
(Organic compound 14)
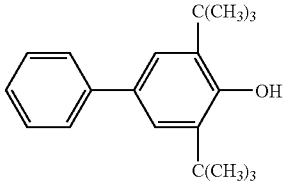
(Organic compound 15)
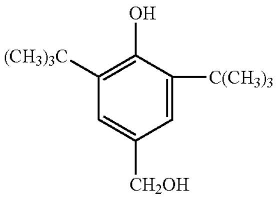
(Organic compound 16)
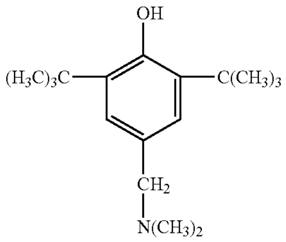

-continued
(Organic compound 17)
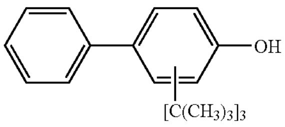
(Organic compound 18)
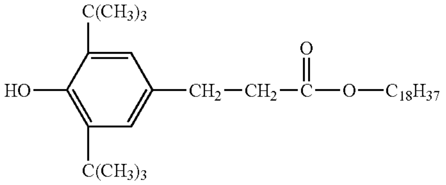
(Organic compound 19)
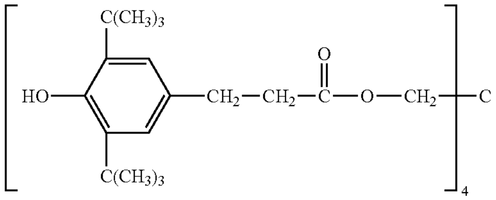
(Organic compound 20)
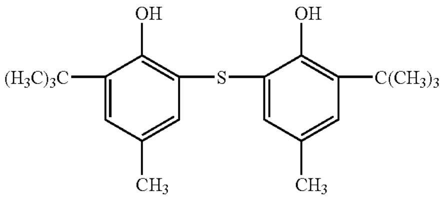
(Organic compound 21)
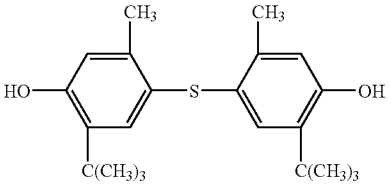
(Organic compound 22)
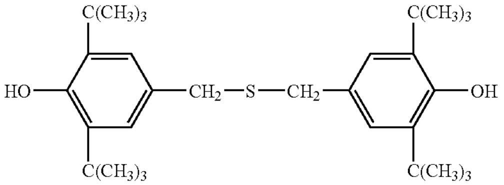
(Organic compound 23)
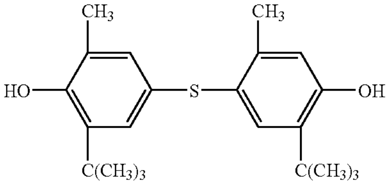
(Organic compound 24)
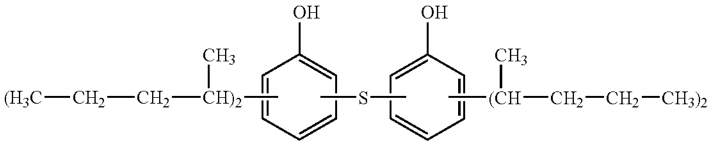
(Organic compound 25)
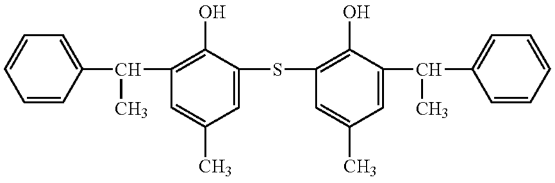
(Organic compound 26)
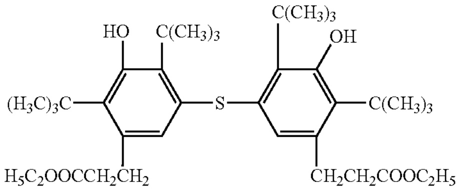
(Organic compound 27)
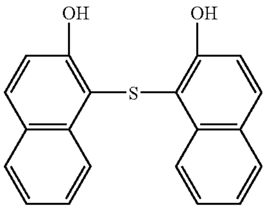
(Organic compound 28)
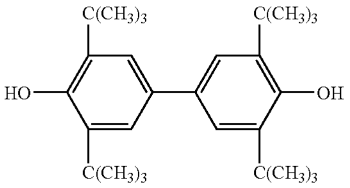

-continued
(Organic compound 29)
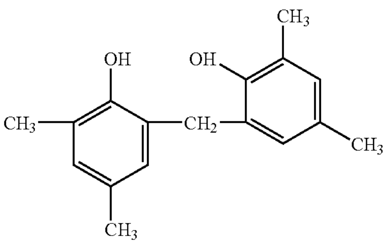
(Organic compound 30)
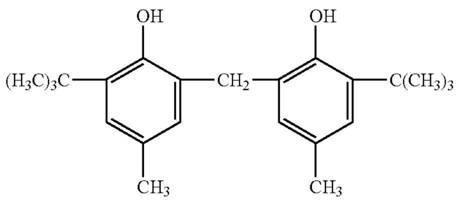
(Organic compound 31)
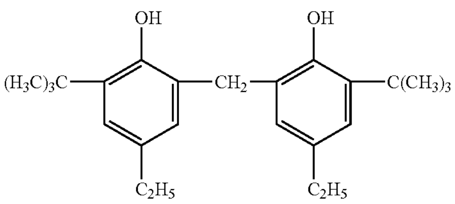
(Organic compound 32)
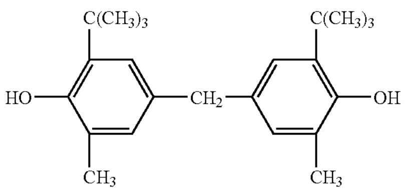
(Organic compound 33)
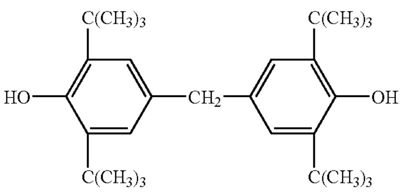
(Organic compound 34)
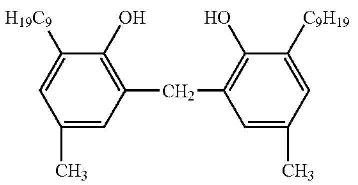
(Organic compound 35)
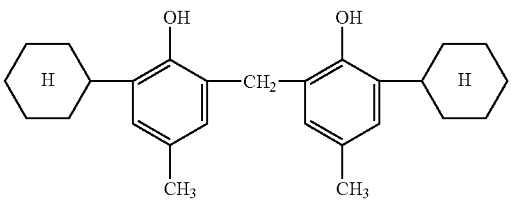
(Organic compound 36)
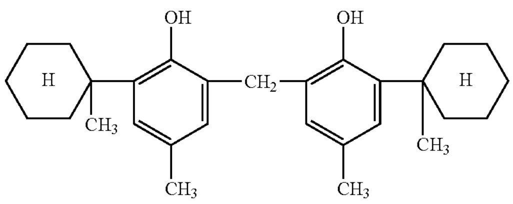
(Organic compound 37)
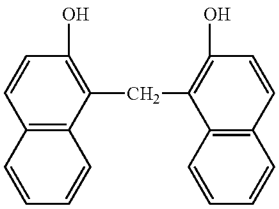
(Organic compound 38)
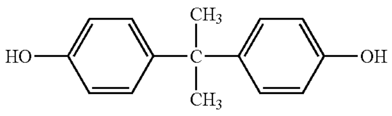
(Organic compound 39)
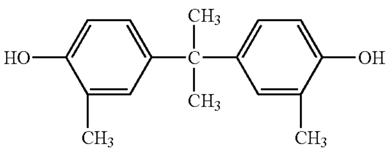
(Organic compound 40)
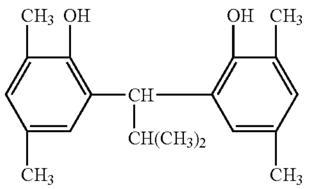
(Organic compound 41)
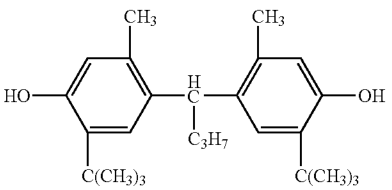
(Organic compound 42)
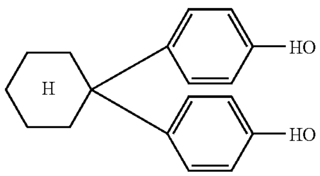

-continued
(Organic compound 43)
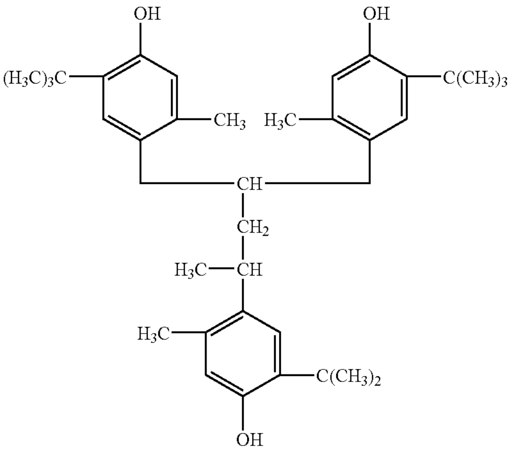
(Organic compound 44)
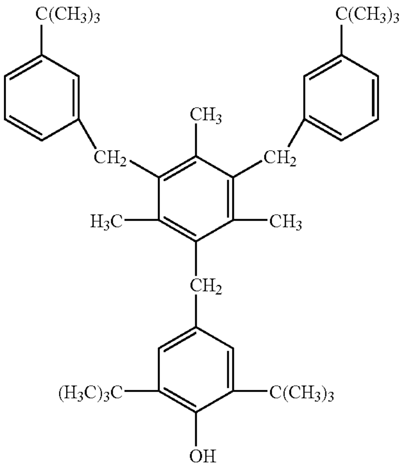
(Organic compound 45)
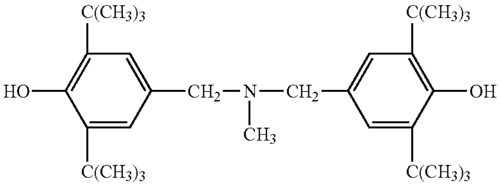
(Organic compound 46)
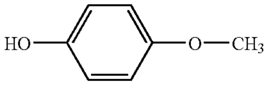
(Organic compound 47)
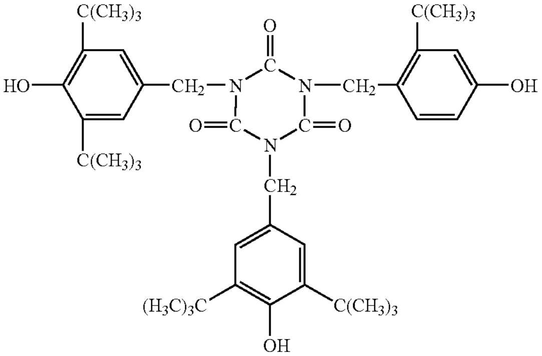
(Organic compound 48)
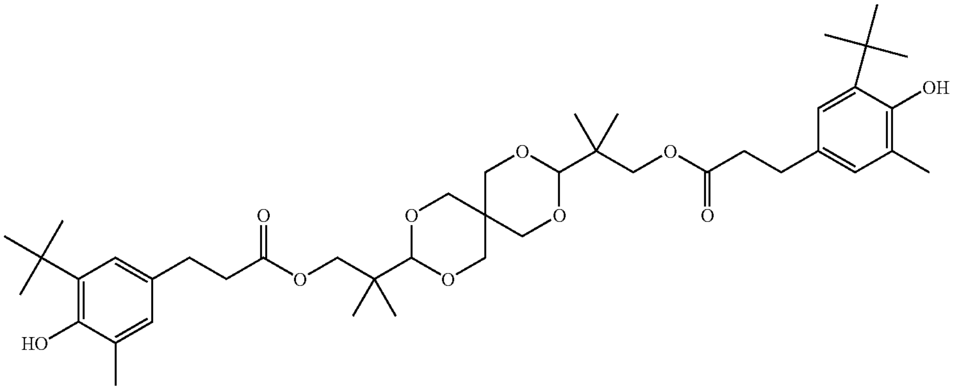
(Organic compound 49)
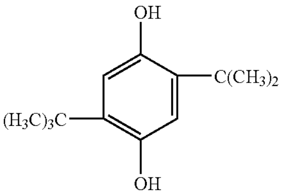
(Organic compound 50)
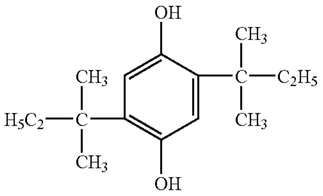

-continued
(Organic compound 51)
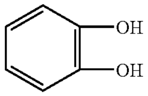
(Organic compound 52)
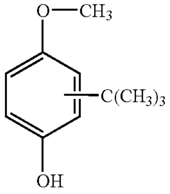
(Organic compound 53)
(Organic compound 54)
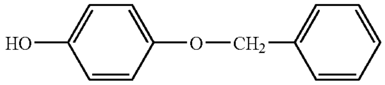
(Organic compound 55)
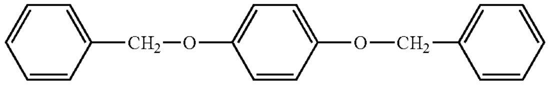
(Organic compound 56)
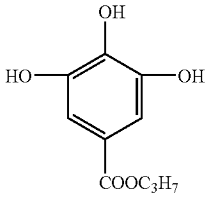
(Organic compound 57)
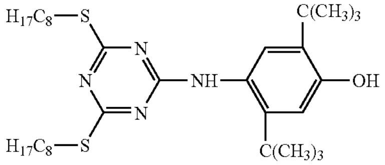
(Organic compound 58)
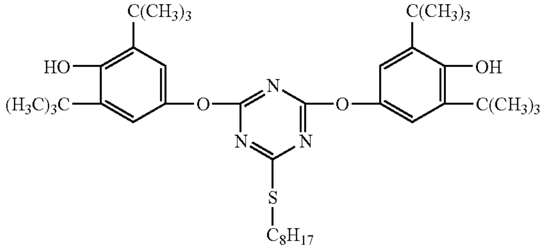
(Organic compound 59)
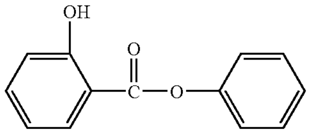
(Organic compound 60)
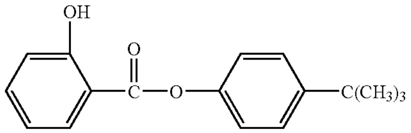
(Organic compound 61)
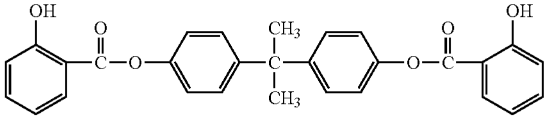
(Organic compound 62)
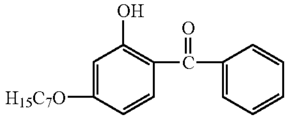
(Organic compound 63)
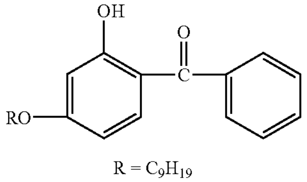
(Organic compound 64)
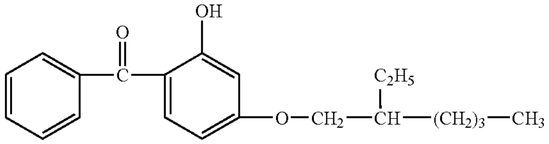
(Organic compound 65)
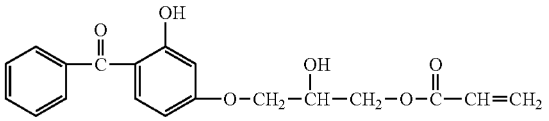
(Organic compound 66)
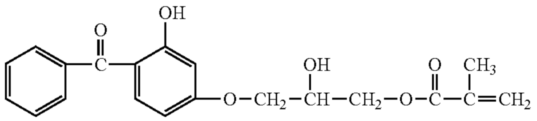

-continued
(Organic compound 67)
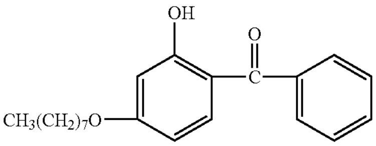
(Organic compound 68)
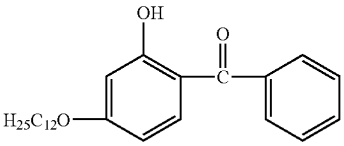
(Organic compound 69)
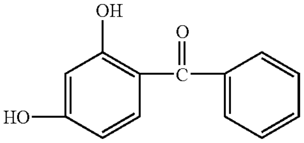
(Organic compound 70)
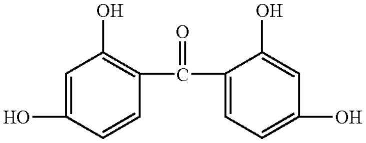
(Organic compound 71)
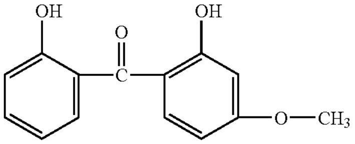
(Organic compound 72)
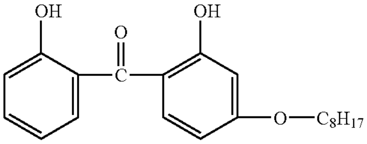
(Organic compound 73)
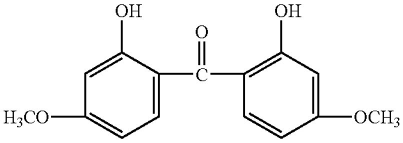
(Organic compound 74)
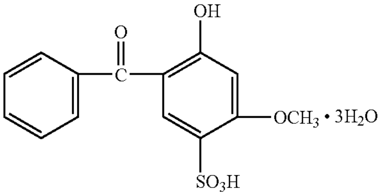
(Organic compound 75)
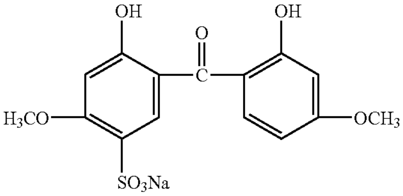
(Organic compound 76)
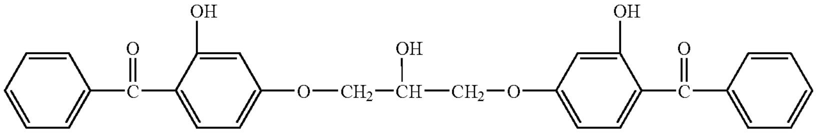
(Organic compound 77)
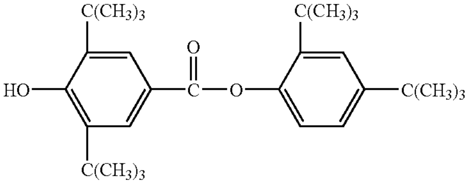
(Organic compound 78)
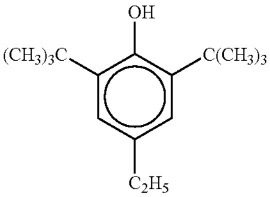
(Organic compound 79)
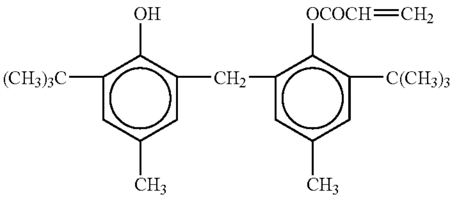
(Organic compound 80)
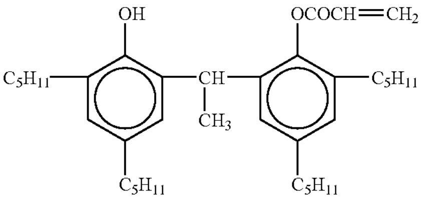

-continued
(Organic compound 81)
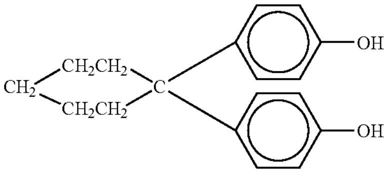
(Organic compound 82)
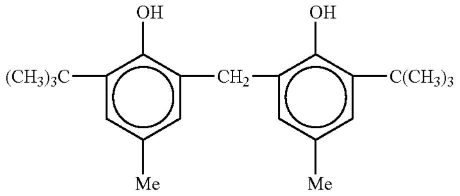
(Organic compound 83)
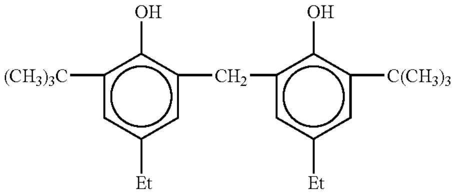
(Organic compound 84)
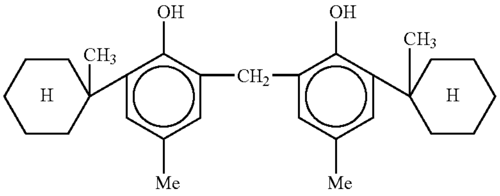
(Organic compound 85)
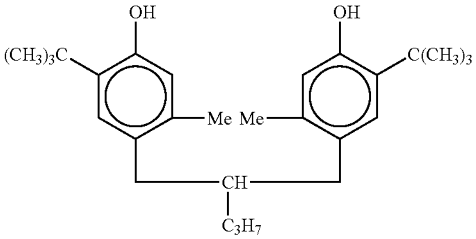
(Organic compound 86)
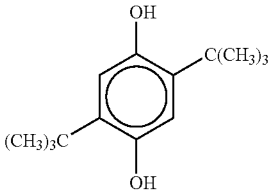
(Organic compound 87)
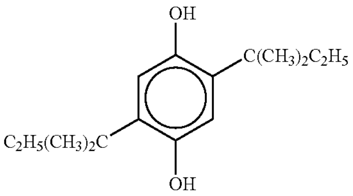
(Organic compound 88)
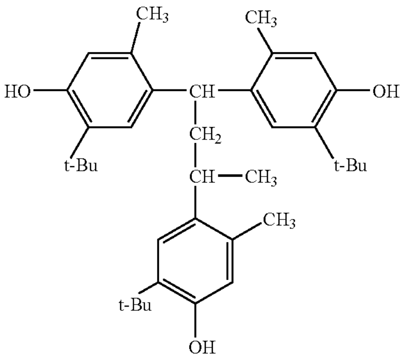
Amine-Based Compounds
(Organic compound 89)
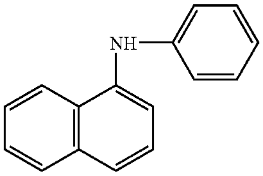
(Organic compound 90)
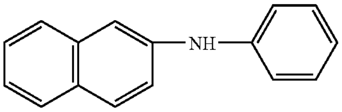
(Organic compound 91)
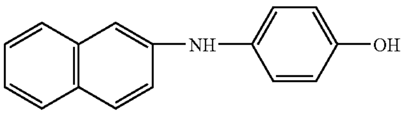
(Organic compound 92)
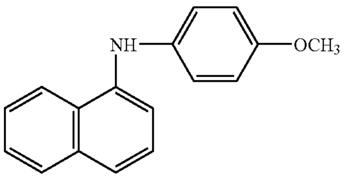

-continued (Organic compound 93)

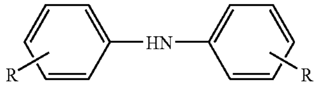

R = $C_7H_{15}$ (Organic compound 94)

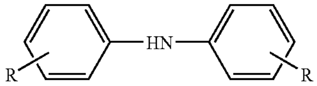

R = $C_8H_{17}$ (Organic compound 95)

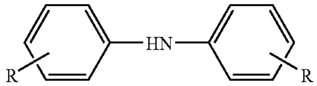

R = $C_9H_{19}$ (Organic compound 96)

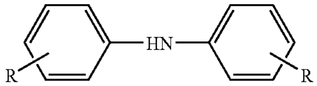

R = $C_{10}H_{21}$ (Organic compound 97)

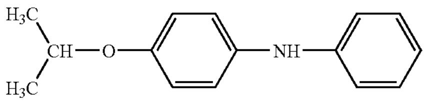

(Organic compound 98)

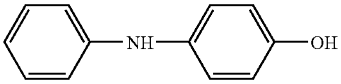

(Organic compound 99)

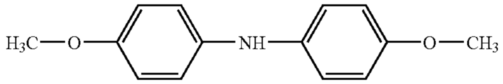

(Organic compound 100)

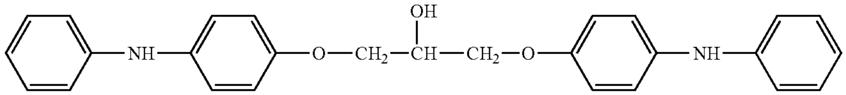

(Organic compound 101)

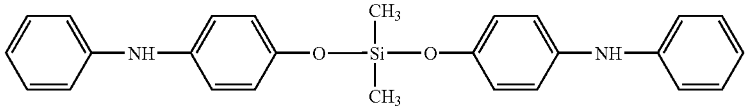

(Organic compound 102)

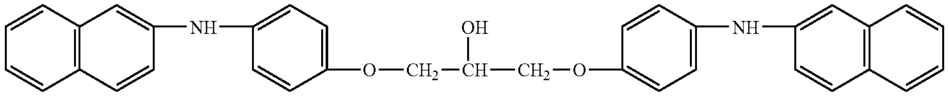

(Organic compound 103)

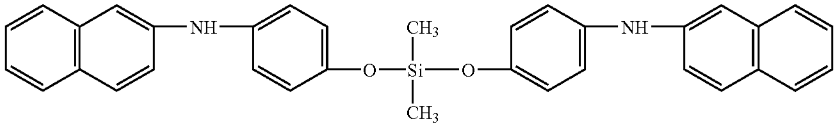

(Organic compound 104)

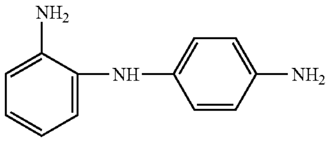

(Organic compound 105)

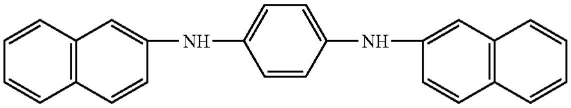

(Organic compound 106)

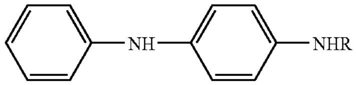

R = $C_7H_{15}$ (Organic compound 107)

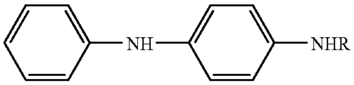

R = $C_8H_{17}$ (Organic compound 108)

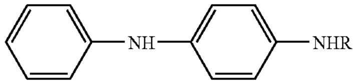

R = $C_9H_{19}$ (Organic compound 109)

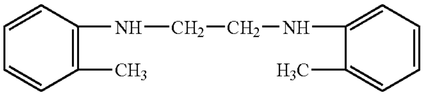

(Organic compound 110)

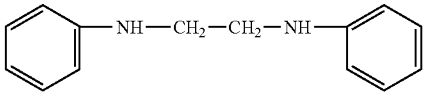

(Organic compound 111)

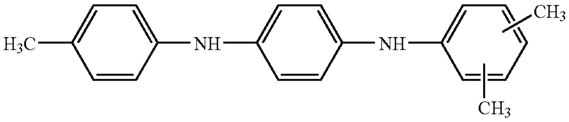

-continued
(Organic compound 112)
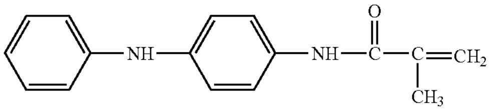
(Organic compound 113)
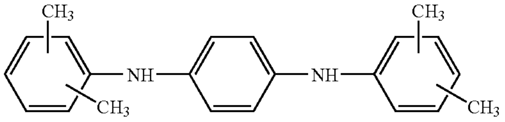
(Organic compound 114)
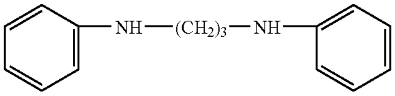
(Organic compound 115)
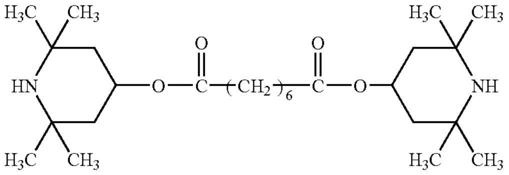
(Organic compound 116)
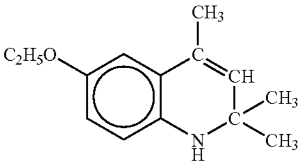
(Organic compound 117)
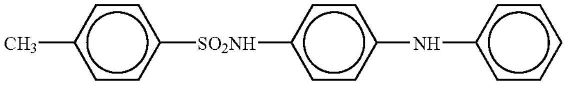
(Organic compound 118)
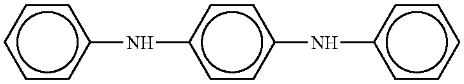
(Organic compound 119)
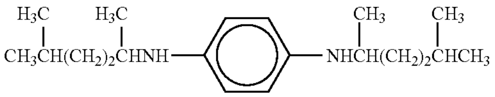
(Organic compound 120)
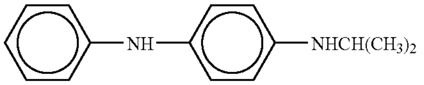
(Organic compound 121)
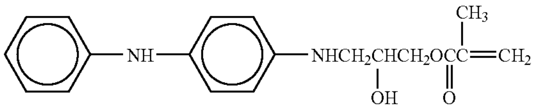
(Organic compound 122)
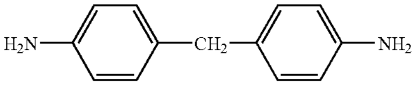
(Organic compound 123)
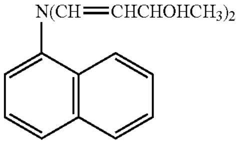
(Organic compound 124)
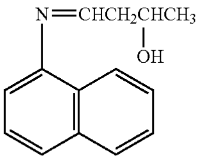
(Organic compound 125)
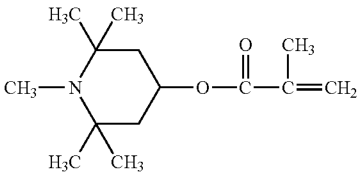
(Organic compound 126)
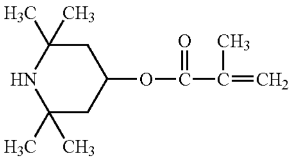
(Organic compound 127)
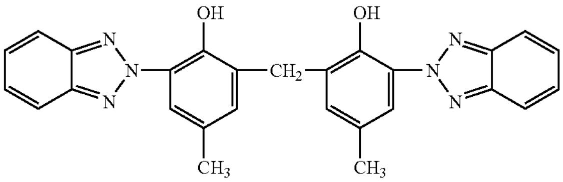

-continued
(Organic compound 128)
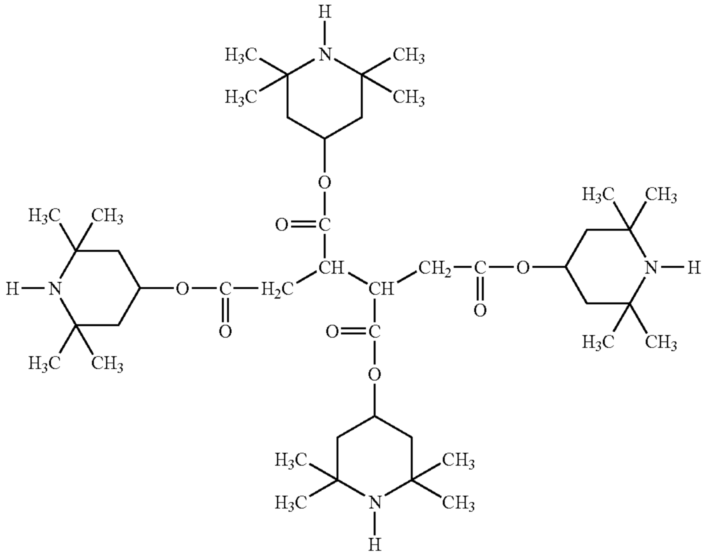
(Organic compound 129)
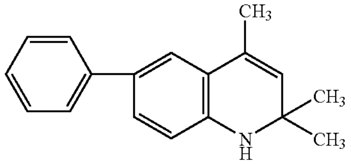
(Organic compound 130)
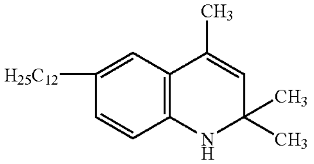
(Organic compound 131)
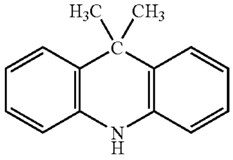
(Organic compound 132)
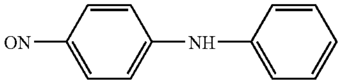
(Organic compound 133)
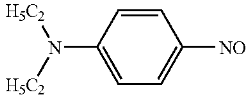
(Organic compound 134)
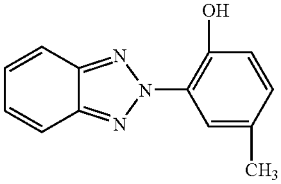
(Organic compound 135)
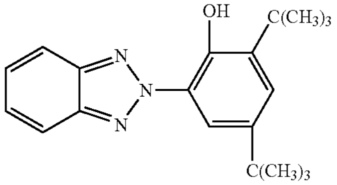
(Organic compound 136)
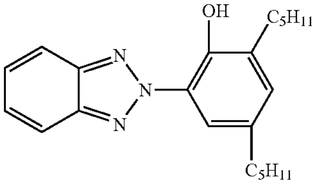
(Organic compound 137)
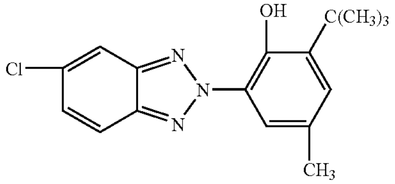
(Organic compound 138)
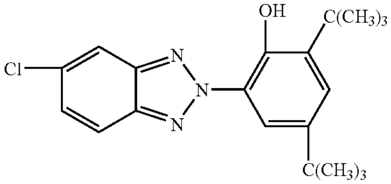

-continued (Organic compound 139)

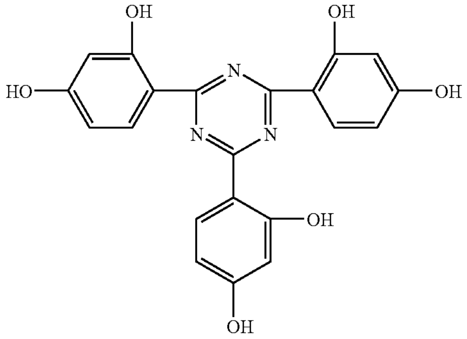

(Organic compound 141)

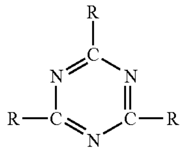

R = —$NHC_6H_4NHC_6H_5$,
—$OC_6H_4NHC_6H_5$ (Organic compound 143)

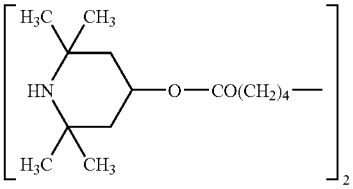

Thiol-Based and Thioether-Based Compounds (Organic Compounds 145 to 153)

(Organic compound 145)

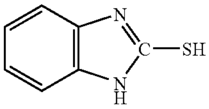

(Organic compound 146)

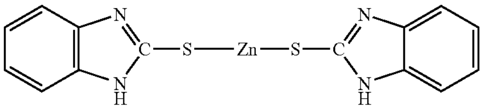

(Organic compound 147)

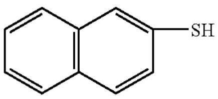

(Organic compound 148)

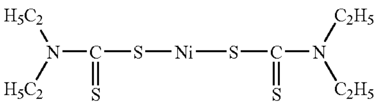

(Organic compound 140)

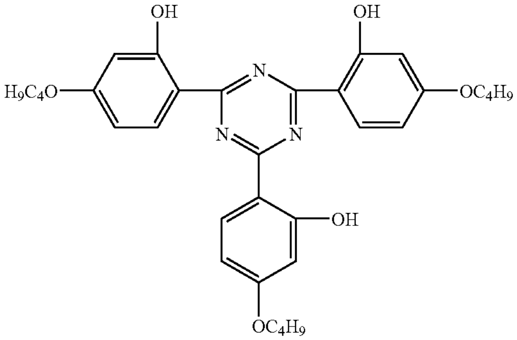

(Organic compound 142)

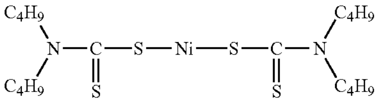

(Organic compound 144)

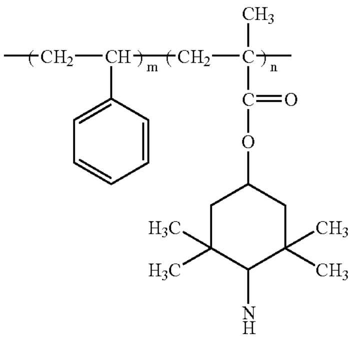

-continued (Organic compound 149)

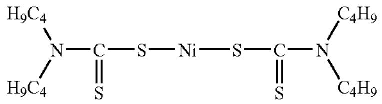

(Organic compound 150)

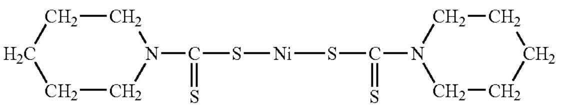

(Organic compound 151)

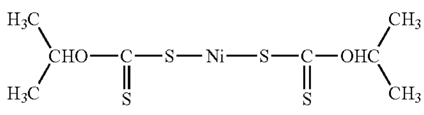

(Organic compound 152)

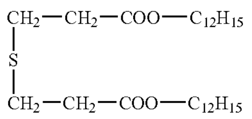

-continued (Organic compound 153)

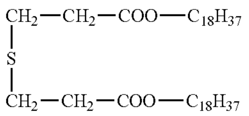

Phosphate Ester-Based Compounds (Organic Compounds 154 to 160)

(Organic compound 154)

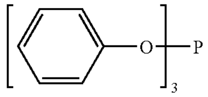

(Organic compound 155)

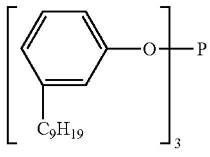

(Organic compound 156)

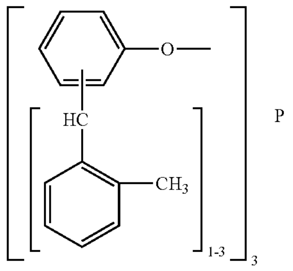

(Organic compound 157)

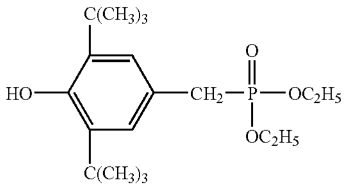

(Organic compound 157)

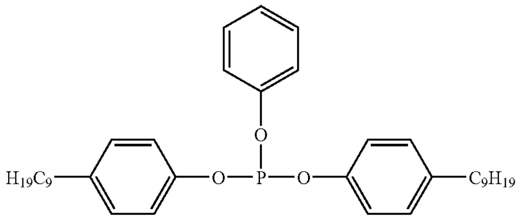

(Organic compound 159)

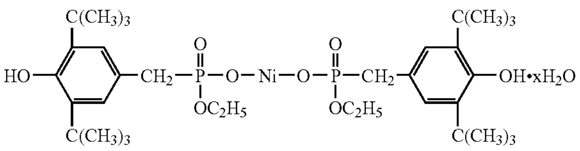

(Organic compound 160)

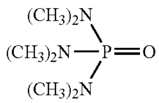

Phenol-Based Organic Compound (Organic compound 161)

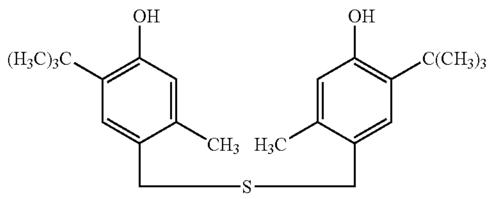

BEST MODE FOR CARRYING OUT THE INVENTION

Then, the embodiments of Examples are explained in detail.

(Production of Carbon Black)

(Carbon Black #1)

To 100 parts by weight of carbon black (N220, made by Mitsubishi Chemical Co., Ltd.; number average particle size of Feret's diameter=210 nm) was added 50 parts by weight of an organic compound 48 (molecular weight=741, melting point=125° C.), and this was charged into a twin-screw extruder. This twin-screw extruder has two screws so as to carry out a mixing process, and a PCM-30 (made by Ikegai Corporation) is used. This extruder is not designed to carry out a continuous kneading process, but modified so as to carry out a stirring process by two screws with the outlet being sealed. After charging the two components into the device so as to have a degree of filling of 94%, a stirring process was carried out thereon in a heated state to a first temperature (Tp1) 160° C. (melting point +35° C.). With respect to the stirring conditions, a first stirring velocity (Sv1) was set to 30 screw revolutions per minute, with a first processing time (T1) being set to 10 minutes; thus, the stirring process was carried out. After the stirring process, the stirred matter was sampled, and the grafted state was confirmed by using a Soxhlet extractor so that a grafted rate of about 30% was obtained. That is, it was confirmed that a grafting process was progressing on the surface of carbon black.

Then, with respect to the stirring conditions of a mixing device, a second stirring velocity (Sv2) was set to 50 screw revolutions per minute, with a second temperature (Tp2) being set to 180° C. (melting point +55° C.), so that the conditions were changed so as to provide a higher mechanical shearing force; thus, the stirring process was carried out for 60 minutes as a second processing time (T2). Thereafter, the stirred matter was cooled, and the processed carbon black was taken out. The above-mentioned organic compound was grafted onto the surface of the carbon black at a grafted rate of 91%. Here, the primary particles were present thereon at 91% on a number basis. The carbon black had a number average particle size of Feret's diameter of 42 nm. This carbon black is referred to as "carbon black #1."

[Carbon Blacks #2 to #4]

The same processes as those of carbon black #1 were carried out except that the production conditions were changed as shown in Tables 1 and 2 so that carbon blacks #2 to #4 were obtained.

[Carbon Black #5]

To 100 parts by weight of carbon black (N220, made by Mitsubishi Chemical Co., Ltd.) was added 80 parts by weight of an organic compound 47 (molecular weight=784, melting point=221° C.), and this was charged into a batch-type twin-screw extruder used in Example 1 so as to have a degree of filling of 94%. Next, a stirring process was carried out thereon in a heated state to 240° C. (melting point +19° C.) (Tp1). In the stirring process, the stirring velocity (Sv1) was set to 35 screw revolutions per minute, and the stirring process was carried out for 15 minutes (T1). After the stirring process, the stirred matter was sampled, and the grafted state was confirmed by using a Soxhlet extractor so that a grafted rate of about 32% was obtained. That is, it was confirmed that a grafting process was progressing on the surface of carbon black. Next, with respect to the stirring conditions of a mixing device, the stirring velocity (Sv2) was set to 55 screw revolutions per minute, with the heating temperature (the second temperature Tp2) being set to 270° C. (melting point +49° C.), so that the conditions were changed so as to provide a higher mechanical shearing force; thus, the stirring process was carried out for 70 minutes as the processing time (T2). Thereafter, the stirred matter was cooled, and the processed carbon black was taken out. The above mentioned organic compound was grafted onto the surface of the carbon black at a grafted rate of 72%. The primary particles were present thereon at 53% on a number basis. The carbon black had a number average particle size of Feret's diameter of 48 nm. This carbon black is referred to as "carbon black #5."

[Carbon Blacks #6 to #9]

The same processes as those of carbon blacks #1 were carried out except that the production conditions were changed as shown in Tables 1 and 2 so that carbon blacks #6 to #9 were obtained.

[Carbon Black #10]

The same processes as those of carbon blacks #1 were carried out except that in place of carbon black (N220, made by Mitsubishi Chemical Co., Ltd.), Raven 1035 (made by Columbia Chemical Co., Ltd.) was used and that the other conditions were changed as shown in Tables 1 and 2 so that carbon blacks #10 was obtained.

[Carbon Black #11]

The same processes as those of carbon blacks #5 were carried out except that in place of carbon black (N220, made by Mitsubishi Chemical Co., Ltd.), Raven 1035 (made by Columbia Chemical Co., Ltd.) was used and that the other conditions were changed as shown in Tables 1 and 2 so that carbon black #11 was obtained.

[Carbon Blacks #12 to 13]

The same processes as those of carbon black #1 were carried out except that the conditions were changed as shown in Tables 1 and 2 so that carbon blacks #12 to #13 were obtained.

[Carbon Black #14]

Carbon black (N220, made by Mitsubishi Chemical Co., Ltd.) that had not been subjected to the surface treatment and the grafting process was defined as "carbon black #14."

[Carbon Black #15]

In carbon black #1, after a lapse of the first processing time (T1) of one minute, a sample was taken out. This sample was defined as "carbon black #15."

[Carbon Black #16]

The same processes as those of carbon black #1 were carried out except that the organic compound was changed to stearic acid (molecular weight=284, melting point=70° C.) (comparative compound 1) that would generate no free radicals. This was defined as "carbon black #16."

[Carbon Black #17]

The same processes as those in the carbon black #16 were carried out except that the carbon black was changed to another carbon black having a number average particle size of Feret's diameter of 500 μm.

To 100 parts of the carbon black #1 was added and mixed 155 parts of the processed carbon black so that carbon black having a number average particle size of Feret's diameter of 320 μm and a number rate of primary particles of 26% was obtained. This was defined as carbon black #17.

With respect to each of the carbon blacks #1 to #17, a number average particle size of Feret's diameter thereof and a number rate of primary particles were shown in Table 3.

TABLE 1

| Carbon black number | Organic compound | | | | First temperature Tp1 (° C.) | Difference from melting point of organic compound (° C.) | Degree of filling (%) | First stirring velocity (number of revolutions/min) Sv1 | First processing time (minute) T1 | Grafted rate (%) |
|---|---|---|---|---|---|---|---|---|---|---|
| | Number | Melting point (° C.) | Molecular weight | Added amount (parts) | | | | | | |
| 1 | 48 | 125 | 741 | 50 | 160 | +35 | 94 | 30 | 10 | 30 |
| 2 | 48 | 125 | 741 | 50 | 150 | +25 | 98 | 30 | 10 | 25 |
| 3 | 48 | 125 | 741 | 50 | 150 | +25 | 98 | 30 | 10 | 25 |
| 4 | 48 | 125 | 741 | 50 | 150 | +25 | 98 | 40 | 10 | 40 |
| 5 | 47 | 221 | 784 | 80 | 240 | +19 | 94 | 35 | 15 | 32 |
| 6 | 88 | 186 | 545 | 50 | 216 | +30 | 98 | 35 | 15 | 35 |
| 7 | 115 | 84 | 481 | 50 | 104 | +20 | 97 | 30 | 5 | 32 |
| 8 | 127 | 195 | 659 | 50 | 215 | +20 | 98 | 35 | 5 | 36 |
| 9 | 128 | 132 | 791 | 50 | 145 | +13 | 91 | 30 | 5 | 26 |
| 10 | 48 | 125 | 741 | 50 | 150 | +25 | 94 | 30 | 10 | 33 |
| 11 | 47 | 221 | 784 | 80 | 231 | +10 | 98 | 30 | 10 | 35 |
| 12 | 48 | 125 | 741 | 50 | 160 | +35 | 94 | 30 | 10 | 30 |
| 13 | 48 | 125 | 741 | 50 | 150 | +25 | 98 | 30 | 5 | 15 |
| 14 | None | — | — | — | — | — | — | — | — | — |
| 15 | 48 | 125 | 741 | 50 | 150 | +25 | 94 | 30 | 1 | 2 |
| 16 | Comparative compound 1 | 70 | 284 | 50 | 105 | +35 | 94 | 30 | 10 | 0 |
| 17 | Comparative compound 1 | 70 | 284 | 50 | 105 | +35 | 94 | 30 | 10 | 0 |

TABLE 2

| Carbon black Number | Second temperature condition Tp2 (° C.) | Difference from melting point of organic compound (° C.) | Second stirring velocity (number of revolutions/min) Sv2 | Processing time (minute) T2 | Grafted rate (%) |
|---|---|---|---|---|---|
| 1 | 180 | +55 | 50 | 60 | 91 |
| 2 | 190 | +65 | 55 | 60 | 93 |
| 3 | 220 | +95 | 60 | 60 | 95 |
| 4 | 220 | +65 | 65 | 60 | 97 |
| 5 | 270 | +49 | 55 | 70 | 72 |
| 6 | 266 | +80 | 60 | 70 | 83 |
| 7 | 174 | +90 | 55 | 40 | 93 |
| 8 | 265 | +70 | 50 | 60 | 94 |
| 9 | 210 | +78 | 50 | 40 | 91 |
| 10 | 190 | +65 | 60 | 40 | 94 |
| 11 | 250 | +29 | 55 | 40 | 90 |
| 12 | 180 | +55 | 50 | 40 | 65 |
| 13 | 190 | +65 | 55 | 10 | 35 |
| 14 | — | — | — | — | — |
| 15 | — | — | — | — | 2 |
| 16 | 125 | +55 | 50 | 30 | 0 |
| 17 | 125 | +55 | 50 | 30 | 0 |

TABLE 3

| Carbon black number | number average particle size of Feret's diameter of carbon black (nm) | Rate of primary particles in number of carbon black (%) | number average particle size of Feret's diameter (nm) of primary particles of carbon black |
|---|---|---|---|
| 1 | 42 | 65 | 25 |
| 2 | 40 | 72 | 25 |
| 3 | 39 | 89 | 25 |
| 4 | 28 | 98 | 25 |
| 5 | 48 | 53 | 28 |
| 6 | 47 | 87 | 28 |
| 7 | 41 | 89 | 28 |
| 8 | 29 | 97 | 28 |
| 9 | 36 | 77 | 28 |
| 10 | 32 | 87 | 28 |
| 11 | 33 | 83 | 28 |
| 12 | 80 | 35 | 25 |
| 13 | 180 | 7 | 25 |
| 14 | 210 | 0 | — |
| 15 | 210 | 1 | could not be measured |
| 16 | 210 | 0 | — |
| 17 | 320 | 15 | 25 |

FIRST EMBODIMENT

FIG. 4

As shown in FIG. 4, a developing roller 110 in accordance with the present Embodiment is provided with a shaft 111, a base rubber layer 112, an intermediate layer 113 and a surface layer 114. Not particularly limited, any material may be used as the shaft 111 as long as it has a conductive property, and a core metal member made of a solid body of metal or a cylindrical member made of metal having a bored hollow portion therein may be used. Examples of the material of the shaft include aluminum and stainless steel.

The base rubber layer 112 is preferably made to have a superior conductivity with low hardness, and its layer thickness is set to 0.5 to 10 mm, with its volume resistivity being preferably set in a range from $1\times10^3$ to $1\times10^7\Omega\cdot$cm. With respect to the material used for forming the base rubber layer 112, examples thereof include styrene-butadiene rubber (SBR), acrylonitrile-butadiene rubber (NBR), natural rubber (NR), silicone rubber, polyurethane-based elastomer and ethylene-propylene-diene rubber (EPDM). The layer is formed by blending the above-mentioned carbon black having a number average Feret's diameter in a range from 5 to 300 nm and primary particles that account for 5% or more on a number basis with any one of these rubber components.

The intermediate layer 113 is a layer formed so as to restrain lack in uniformity of conductivity, and the layer thickness thereof is preferably set in a range from 5 to 1000 μm, with its volume resistivity being set in a range from in a range from $1\times10^4$ to $1\times10^6\Omega\cdot$cm. Although not particularly limited, examples of the material for forming the intermediate layer 113 include materials formed by blending a conductive agent such as carbon black, graphite, iron oxide, zinc oxide, titanium oxide and tin oxide with acrylonitrile-butadiene rubber (NBR), hydrogenated acrylonitrile-butadiene rubber (H-NBR), polyurethane-based elastomer, chloroprene rubber (CR), natural rubber, butadiene rubber (BR), butyl rubber (IIR), hydrin rubber or nylon.

The surface layer 114 is required to have an appropriate surface roughness so as to mechanically hold and transport the toner, and an appropriate insulating property so as to hold a charge of the toner. It is also required to have an abrasion resistant property because it is made in contact with the toner layer thickness regulating member. The layer thickness of the surface layer 114 is preferably set to 5 to 1000 μm, with its volume resistivity being set in a range from $1\times10^5$ to $1\times10^9\Omega\cdot$cm, and with respect to the forming material, examples thereof include materials formed by blending a conductive agent, a charge control agent and the like, such as carbon black, graphite, iron oxide, zinc oxide, titanium oxide and tin oxide, with silicone graft acrylic polymer, silicone-modified polyurethane, or the like.

Second Embodiment

FIG. 5

A developing roller 120 in accordance with the second Embodiment, shown in FIG. 5, is different from the developing roller 110 of the first Embodiment in that the intermediate layer is omitted. In the developing roller 120 of the second Embodiment, carbon black having a number average Feret's diameter in a range from 5 to 300 nm and primary particles that account for 5% or more on a number basis is used as the conductive agent for the base rubber layer 122 so that the lack in uniformity of conductivity of the base rubber layer is made smaller in comparison with that of the conventional structure; therefore, even in the structure from which the intermediate layer is omitted, the lack in uniformity of density in a toner image to be developed can be suppressed within the permissible range.

Third Embodiment

FIG. 6

The developing roller 130 of the present Embodiment is different from the developing roller 110 of the first Embodiment in that the carbon black to be used as the conductive agent, which has a number average Feret's diameter in a range from 5 to 300 nm and primary particles that account for 5% or more on a number basis, is contained not in the base rubber layer, but in the intermediate layer. That is, the base rubber layer 132 contains a generally-used material, such as carbon black, graphite, iron oxide, zinc oxide, titanium oxide and tin oxide, as the conductive agent, and the intermediate layer 133 contains as its conductive agent carbon black having a number average Feret's diameter in a range from 5 to 300 nm and primary particles that account for 5% or more on a number basis in a dispersed manner.

Fourth Embodiment

FIG. 7

The developing roller 140 of the present Embodiment is different from the developing roller 110 of the first Embodiment in that the carbon black to be used as the conductive agent, which has a number average Feret's diameter in a range from 5 to 300 nm and primary particles that account for 5% or more on a number basis, is contained not in the base rubber layer, but in the surface layer. That is, the base rubber layer 142 contains a generally-used material, such as carbon black, graphite, iron oxide, zinc oxide, titanium oxide and tin oxide, as the conductive agent, and the surface layer 144 contains as its conductive agent carbon black having a number average Feret's diameter in a range from 5 to 300 nm and primary particles that account for 5% or more on a number basis in a dispersed manner.

The following description will discuss specific Examples and Comparative Examples of the respective Embodiments.

EXAMPLE 1-1

The developing roller 1 of the first Embodiment was obtained by the following manufacturing processes as a developing roller of Example 1-1.

First, a core metal member, made of SUS304 having an outer diameter of 10 mm, was prepared as a shaft 111.

To prepare a base rubber layer 112, 10 parts by mass of the carbon black #1 serving as a conductive agent was added to 100 parts by mass of silicone rubber, and to this was further added 5 parts by mass of tin oxide as a conductive agent and kneaded by using a twin-screw extruder PCM-30 (made by Ikegai Corporation) so that a compounded rubber material was obtained; then, this compounded rubber material was successively extruded onto the outer peripheral surface of the core metal member so that a layer having a thickness of 5 mm was formed. The base rubber layer thus obtained had a volume resistance value of $1\times10^5\Omega\cdot$cm.

To prepare an intermediate layer 113, 5 parts by mass of zinc oxide serving as a conductive agent, 3 parts by mass of a curing accelerator BZ, 1 part by mass of sulfur serving as a curing agent and 100 parts by mass of methylethyl ketone were added to 100 parts by mass of hydrogenated acrylonitrile-butadiene rubber (H-NBR), and this was dispersed by using a ball mill so that a coating solution for the intermediate layer was prepared, and this coating solution was applied to the outer peripheral face of the base rubber layer, and dried and heated thereon under a temperature condition of 80° C. so that an intermediate layer having a thickness of 20 μm was formed. The intermediate layer 113 thus obtained had a volume resistance value of $1\times10^7\Omega\cdot$cm.

To prepare a surface layer 114, 10 parts by mass of zinc oxide was added to 100 parts by mass of silicone graft acrylic polymer, and this was melt-mixed by using two rollers to prepare a composition, and this composition was applied to the intermediate layer by using a cross roller so that the surface layer 114 having a thickness of 40 μm was formed thereon. Its volume resistance value was $1\times10^6\Omega\cdot$cm.

Examples 1-2 to 1-12 and Comparative Examples 1-1 to 1-5

The same method and the same materials as those of Example 1-1 were used except that, with respect to the base rubber layer 112 of Example 1-1, in place of carbon black #1, each of carbon blacks #2 to #17 was used as the conductive agent. Carbon blacks #2 to #12 were used for Examples 1-2 to 1-12, and carbon blacks #13 to #17 were used for Comparative Examples 1-1 to 1-5.

Examples 2-1 to 2-12 and Comparative Examples 2-1 to 2-5

Upon manufacturing the developing roller 120 of the second Embodiment, the same manufacturing methods as those of the above-mentioned Examples 1-1 to 1-12 and Comparative Examples 1-1 to 1-5 were used except that the surface layer 124 was directly formed on the outer peripheral face of the base rubber layer 122 without using the intermediate layer so that developing rollers 120 of Examples 2-1 to 2-12 and Comparative Examples 2-1 to 2-5 were obtained.

Example 3-1

Upon manufacturing the developing roller 130 of the third Embodiment, the same manufacturing method as that of the Example 1-1 was adopted except that in place of carbon black #1 used for the base rubber layer in the manufacturing method of the Example 1-1, tin oxide was used, and except that in place of zinc oxide serving as a conductive agent used for forming the intermediate layer, the carbon black #1 was used.

Examples 3-2 to 3-12 and Comparative Examples 1-1 to 1-5

The same method and the same materials as those of Example 3-1 were used except that, with respect to the intermediate layer 133 of Example 3-1, in place of carbon black #1, each of carbon blacks #2 to #17 was used as the conductive agent. Carbon blacks #2 to #12 were used for Examples 3-2 to 3-12, and carbon blacks #13 to #17 were used for Comparative Examples 3-1 to 4-5.

Example 4-1

Upon manufacturing the developing roller 140 of the fourth Embodiment, the same manufacturing method as that of the Example 1-1 was adopted except that in place of carbon black used for the base rubber layer in the manufacturing method of the Example 1-1, tin oxide was used, and except that in place of zinc oxide serving as a conductive agent used for forming the surface layer, carbon black #1 was used.

Examples 4-2 to 4-12 and Comparative Examples 4-1 to 4-5

The same method and the same materials as those of Example 1-1 were used except that, with respect to the surface layer 144 of Example 4-1, in place of carbon black #1, each of carbon blacks #2 to #17 was used as the conductive agent so that each of developing rollers 140 of Examples 4-2 to 4-12 and Comparative Examples 4-1 to 4-5 was obtained.

Comparative Example 5

The same manufacturing method as that of Example 1-1 was carried out except that the base rubber layer 112 of the developing roller 110 of Example 1-1, the base rubber layer 122 of Example 2-1 was adopted so that a developing roller was obtained. This developing roller was used for Comparative Example 5.

Comparative Example 6

The same manufacturing method as that of Example 2-1 was carried out except that the base rubber layer 122 of the developing roller 120 of Example 2-1, the base rubber layer 132 of Example 3-1 was adopted so that a developing roller was obtained. This developing roller was used for Comparative Example 6.

(Evaluation)

Each of the developing rollers of Examples 1-1 to 1-12, 2-1 to 2-12, 3-1 to 3-12 and 4-1 to 4-12 and Comparative Examples 1-1 to 1-5, 2-1 to 2-5, 3-1 to 3-5, 4-1 to 4-5, 5 and 6, obtained as described above, was applied to a monochrome printer (LP-1380: made by Konia Minolta Business Technologies, Inc.), and 5,000 sheets of copies of an image with a pixel rate of 5% were printed in a one-sheet intermittent mode under a low temperature-low humidity environment (10° C./10% RH); thereafter, a monochrome solid image was printed on a sheet of thin plain paper having a weight of 45 g, and by using a Sakura Densitometer PDA-65 (made by Konica Minolta Holdings, Inc.), the transmission density light quantity was measured on arbitrary ten points. In this case, the relative transmission density was found, with the transmission density of paper being set to "0". With respect to the transmission density of the paper, an average value of measured values obtained at arbitrary ten points was used. Table 4 shows the results.

TABLE 4

| | Transmission density | | |
|---|---|---|---|
| Example No. | Maximum | Minimum | Difference between Max. and Min. |
| Example 1-1 | 1.83 | 1.78 | 0.05 |
| Example 1-2 | 1.82 | 1.78 | 0.04 |
| Example 1-3 | 1.82 | 1.79 | 0.03 |
| Example 1-4 | 1.84 | 1.82 | 0.02 |
| Example 1-5 | 1.80 | 1.74 | 0.06 |
| Example 1-6 | 1.82 | 1.79 | 0.03 |
| Example 1-7 | 1.83 | 1.80 | 0.03 |
| Example 1-8 | 1.84 | 1.83 | 0.01 |
| Example 1-9 | 1.81 | 1.77 | 0.04 |

TABLE 4-continued

| | Transmission density | | |
|---|---|---|---|
| Example No. | Maximum | Minimum | Difference between Max. and Min. |
| Example 1-10 | 1.82 | 1.79 | 0.03 |
| Example 1-11 | 1.81 | 1.79 | 0.02 |
| Example 1-12 | 1.80 | 1.76 | 0.04 |
| Comparative Example 1-1 | 1.81 | 1.69 | 0.12 |
| Comparative Example 1-2 | 1.79 | 1.66 | 0.13 |
| Comparative Example 1-3 | 1.77 | 1.60 | 0.17 |
| Comparative Example 1-4 | 1.79 | 1.62 | 0.17 |
| Comparative Example 1-5 | 1.79 | 1.67 | 0.12 |
| Example 2-1 | 1.82 | 1.77 | 0.05 |
| Example 2-2 | 1.81 | 1.77 | 0.04 |
| Example 2-3 | 1.81 | 1.78 | 0.03 |
| Example 2-4 | 1.83 | 1.81 | 0.02 |
| Example 2-5 | 1.80 | 1.73 | 0.07 |
| Example 2-6 | 1.81 | 1.78 | 0.03 |
| Example 2-7 | 1.82 | 1.79 | 0.03 |
| Example 2-8 | 1.83 | 1.81 | 0.02 |
| Example 2-9 | 1.82 | 1.78 | 0.04 |
| Example 2-10 | 1.81 | 1.78 | 0.03 |
| Example 2-11 | 1.82 | 1.79 | 0.03 |
| Example 2-12 | 1.79 | 1.74 | 0.05 |
| Comparative Example 2-1 | 1.80 | 1.68 | 0.12 |
| Comparative Example 2-2 | 1.78 | 1.65 | 0.13 |
| Comparative Example 2-3 | 1.76 | 1.59 | 0.17 |
| Comparative Example 2-4 | 1.78 | 1.63 | 0.15 |
| Comparative Example 2-5 | 1.79 | 1.67 | 0.12 |
| Example 3-1 | 1.81 | 1.76 | 0.05 |
| Example 3-2 | 1.80 | 1.76 | 0.04 |
| Example 3-3 | 1.80 | 1.77 | 0.03 |
| Example 3-4 | 1.83 | 1.81 | 0.02 |
| Example 3-5 | 1.81 | 1.74 | 0.07 |
| Example 3-6 | 1.82 | 1.79 | 0.03 |
| Example 3-7 | 1.82 | 1.78 | 0.04 |
| Example 3-8 | 1.83 | 1.81 | 0.02 |
| Example 3-9 | 1.82 | 1.78 | 0.04 |
| Example 3-10 | 1.81 | 1.78 | 0.03 |
| Example 3-11 | 1.82 | 1.79 | 0.03 |
| Example 3-12 | 1.79 | 1.74 | 0.05 |
| Comparative Example 3-1 | 1.80 | 1.68 | 0.12 |
| Comparative Example 3-2 | 1.78 | 1.65 | 0.13 |
| Comparative Example 3-3 | 1.76 | 1.59 | 0.17 |
| Comparative Example 3-4 | 1.78 | 1.63 | 0.15 |
| Comparative Example 3-5 | 1.78 | 1.66 | 0.12 |
| Example 4-1 | 1.83 | 1.78 | 0.05 |
| Example 4-2 | 1.82 | 1.78 | 0.04 |
| Example 4-3 | 1.82 | 1.79 | 0.03 |
| Example 4-4 | 1.84 | 1.82 | 0.02 |
| Example 4-5 | 1.80 | 1.74 | 0.06 |
| Example 4-6 | 1.82 | 1.79 | 0.03 |
| Example 4-7 | 1.83 | 1.80 | 0.03 |
| Example 4-8 | 1.84 | 1.83 | 0.01 |
| Example 4-9 | 1.81 | 1.77 | 0.04 |
| Example 4-10 | 1.82 | 1.79 | 0.03 |
| Example 4-11 | 1.81 | 1.79 | 0.02 |
| Example 4-12 | 1.80 | 1.76 | 0.04 |
| Comparative Example 4-1 | 1.81 | 1.69 | 0.12 |
| Comparative Example 4-2 | 1.79 | 1.66 | 0.13 |
| Comparative Example 4-3 | 1.77 | 1.60 | 0.17 |

TABLE 4-continued

| Example No. | Transmission density Maximum | Minimum | Difference between Max. and Min. |
|---|---|---|---|
| Comparative Example 4-4 | 1.79 | 1.62 | 0.17 |
| Comparative Example 4-5 | 1.79 | 1.67 | 0.12 |
| Comparative Example 5 | 1.78 | 1.60 | 0.18 |
| Comparative Example 6 | 1.77 | 1.58 | 0.19 |

As clearly understood by Table 4, when an image-forming process was carried out by using the developing roller of each of Examples in accordance with the present invention, it was possible to reduce lack in uniformity of density in a solid image, in comparison with the image-forming process carried out by using the developing roller of each of Comparative Examples, and improvements in image quality were consequently confirmed.

Explanation of Reference Numeral

Figure 1:
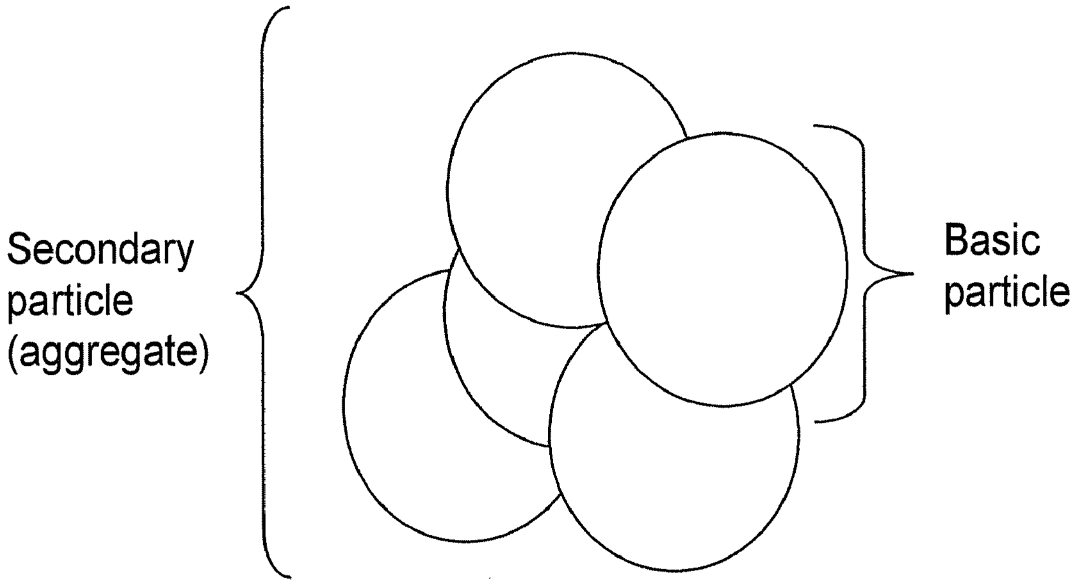
FIG. 1 is a drawing that explains the relationship between a secondary particle and basic particles.
Figure 2:
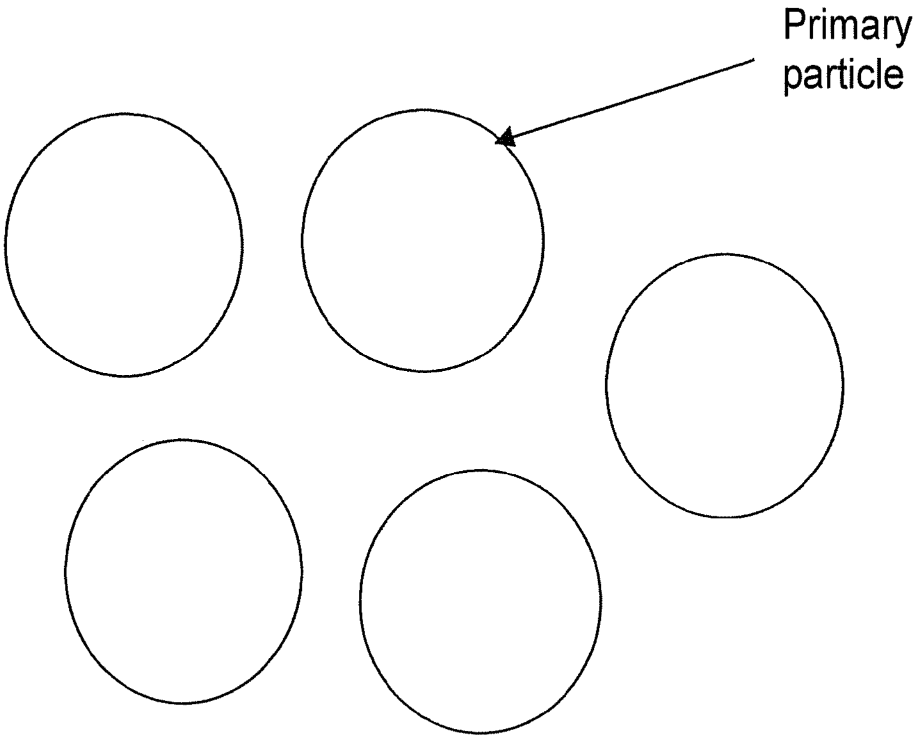
FIG. 2 is a drawing that shows a state in which basic particles forming a secondary particle are separated from the secondary particle and present in a stable manner.
Figure 3:
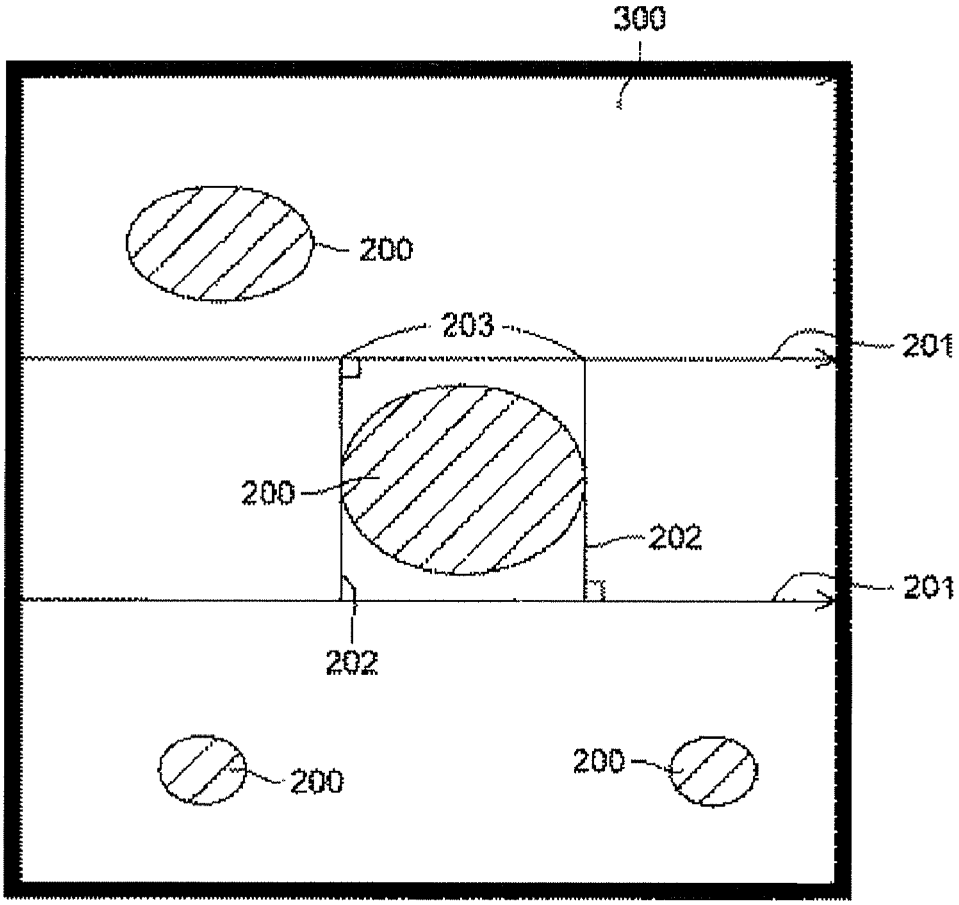
FIG. 3 is a drawing that explains Feret's diameter to be used in the present invention.
Figure 4:
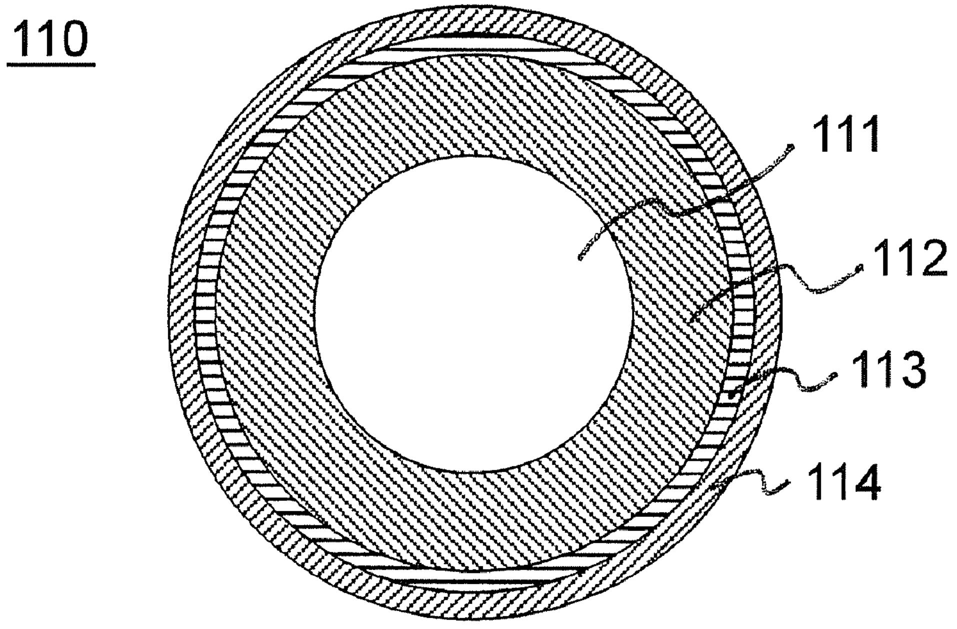
FIG. 4 is a cross-sectional view showing a structure of a developing roller in accordance with a first Embodiment of the present invention.
Figure 5:
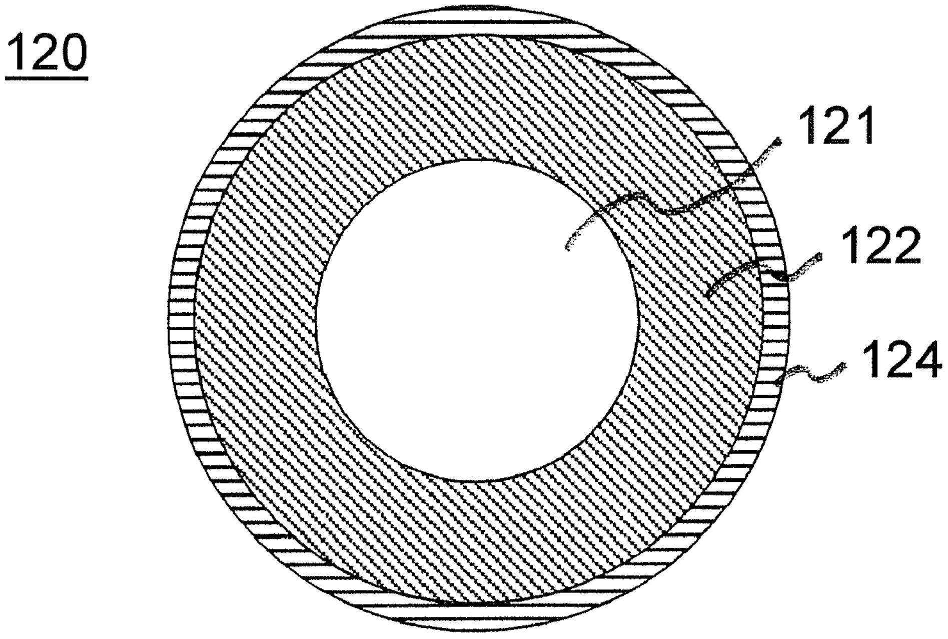
FIG. 5 is a cross-sectional view showing a structure of a developing roller in accordance with a second Embodiment of the present invention.
Figure 6:
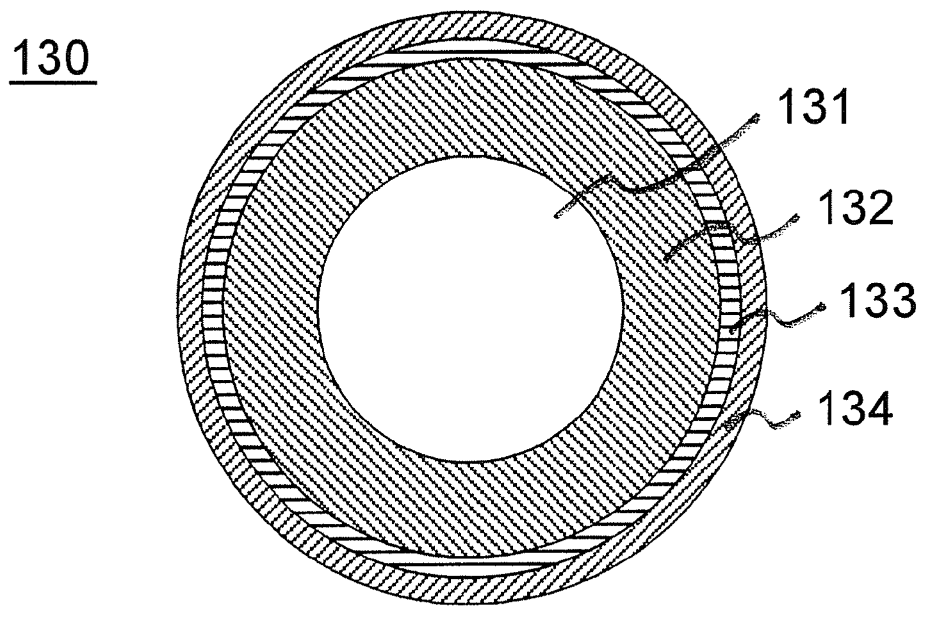
FIG. 6 is a cross-sectional view showing a structure of a developing roller in accordance with a third Embodiment of the present invention.
Figure 7:
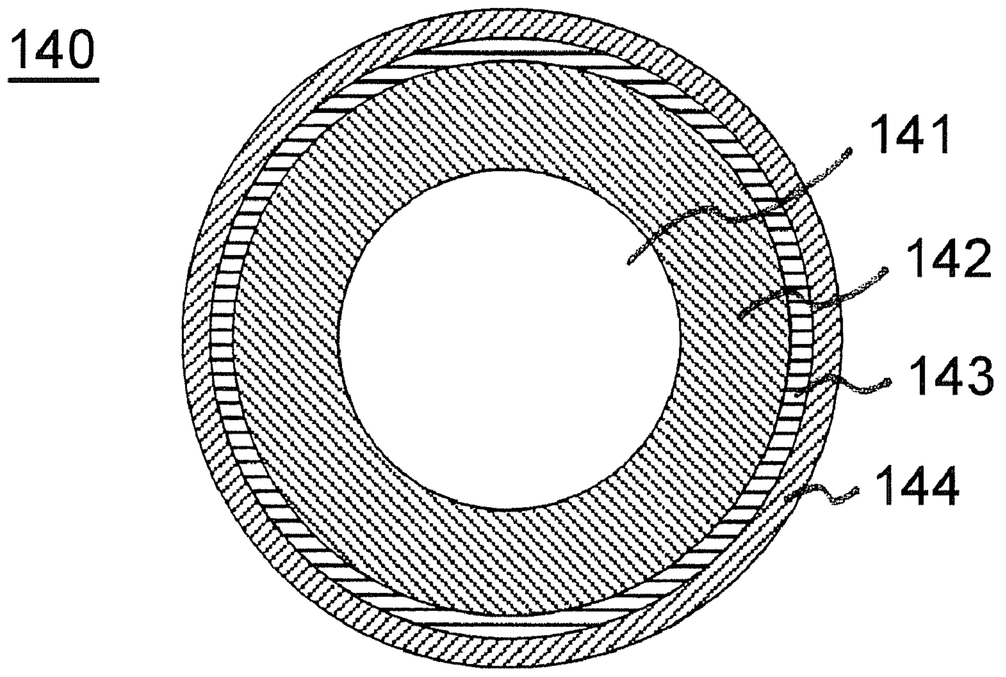
FIG. 7 is a cross-sectional view showing a structure of a developing roller in accordance with a fourth Embodiment of the present invention.
Figure 8:
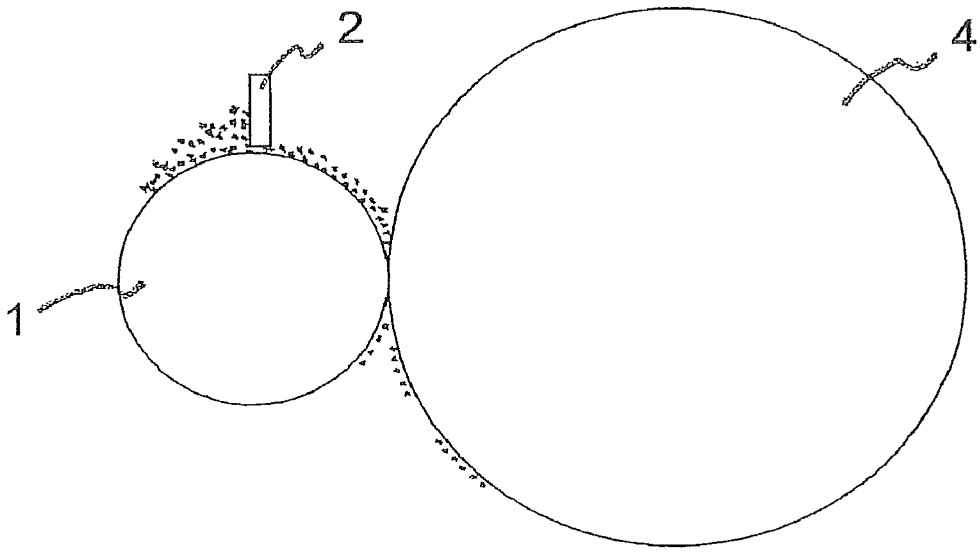
FIG. 8 is a drawing that explains a developing process in a general electrophotographic process.
Figure 9:
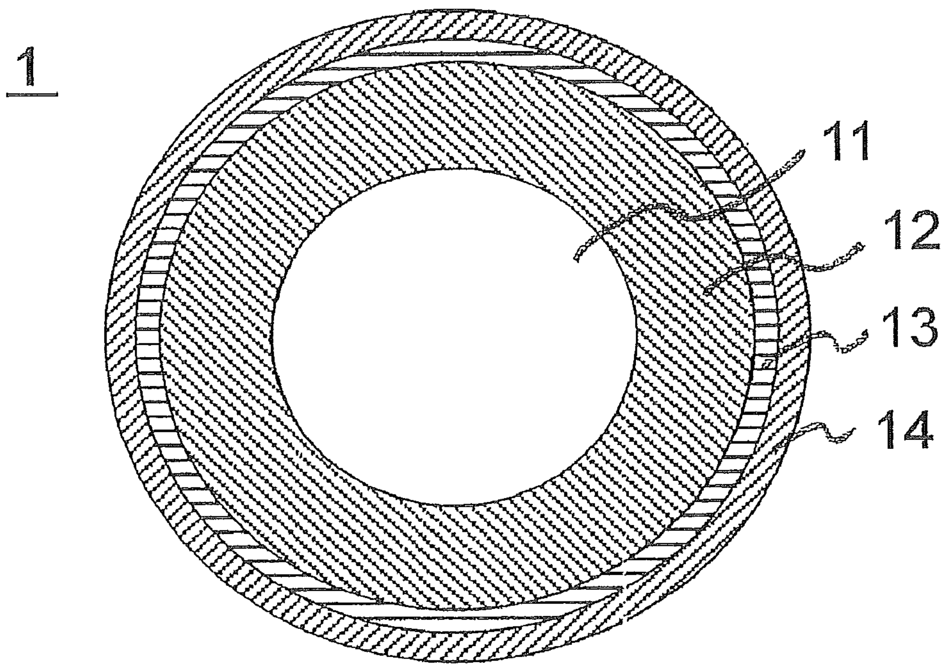
FIG. 9 is a cross-sectional view that shows a structure of a conventional developing roller.
Figure 10:
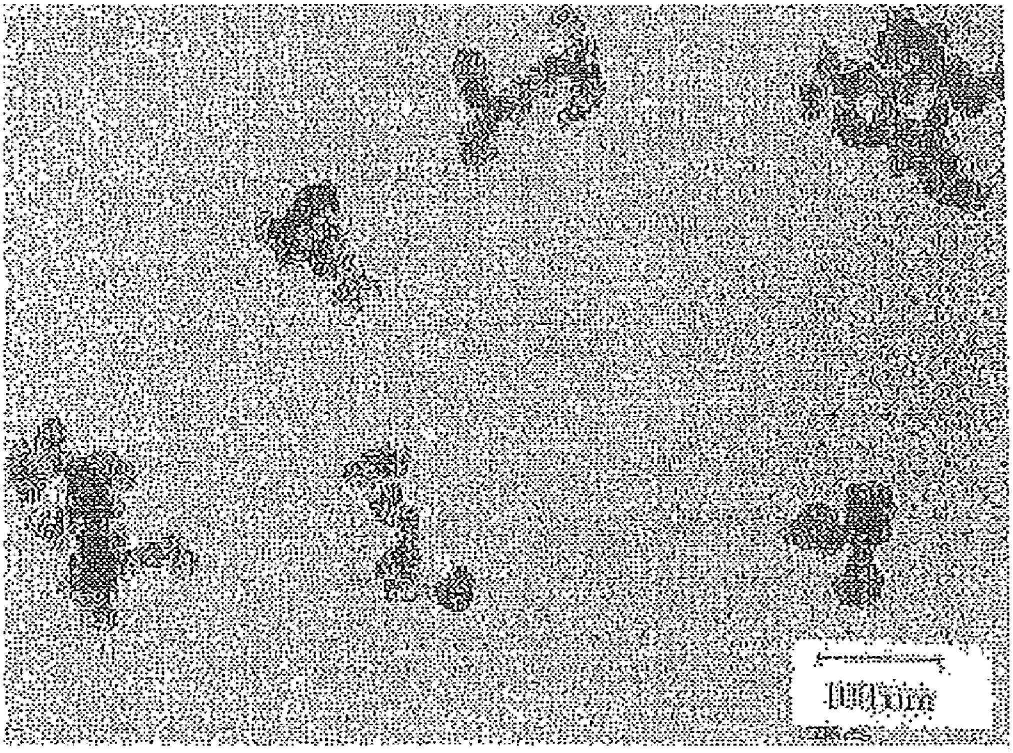
FIG. 10 is a drawing that shows an aggregate (structure) of conventional carbon black.

110, 120, 130, 140: Developing roller
111, 121, 131, 141: Shaft
112, 122, 132, 142: Base rubber layer
113, 133, 143: Intermediate layer
114, 124, 134, 144: Surface layer

The invention claimed is:

1. A developing roller comprising:

a supporting shaft, and at least one resin layer formed on a peripheral face of the supporting shaft, the resin layer containing carbon black in which a number average Feret's diameter is in a range from 5 to 300 nm and primary particles account for 5% or more on a number basis, and the carbon black being dispersed in a base resin material thereof; and wherein a surface of the carbon black particle is surface-treated with a phenol-based organic compound having a molecular weight of 50 or more to 1500 or less.

2. The developing roller of claim 1, wherein the resin layer comprises a plurality of resin layers, with at least one of the resin layers having the carbon black dispersed therein.

3. The developing roller of claim 2, wherein the resin layers comprise a base rubber layer formed on the supporting shaft and a surface layer formed on the peripheral side from the base rubber layer.

4. The developing roller of claim 3, wherein the carbon black is dispersed in the base rubber layer.

5. The developing roller of claim 3, wherein the carbon black is dispersed in the surface layer.

6. The developing roller of claim 3, wherein an intermediate layer is formed between the base rubber layer and the surface layer.

7. The developing roller of claim 6, wherein the carbon black is dispersed in the intermediate layer.

* * * * *